US012643102B2

(12) United States Patent
Han et al.

(10) Patent No.: US 12,643,102 B2
(45) Date of Patent: Jun. 2, 2026

(54) METHOD OF PROFILING A SAMPLE COMPRISING A PLURALITY OF CELLS AND A SYSTEM FOR PERFORMING THE SAME

(71) Applicants: Massachusetts Institute of Technology, Cambridge, MA (US); National University Hospital (Singapore) Pte. Ltd., Singapore (SG)

(72) Inventors: Jongyoon Han, Cambridge, MA (US); Kerwin Zeming Kwek, Singapore (SG); Win Sen Kuan, Singapore (SG)

(73) Assignees: Massachusetts Institute of Technology, Cambridge, MA (US); National University Hospital (Singapore) Pte. Ltd., Singapore (SG)

( * ) Notice: Subject to any disclaimer, the term of this patent is extended or adjusted under 35 U.S.C. 154(b) by 891 days.

(21) Appl. No.: 17/758,531

(22) PCT Filed: Jan. 8, 2021

(86) PCT No.: PCT/SG2021/050011

§ 371 (c)(1),
(2) Date: Jul. 8, 2022

(87) PCT Pub. No.: WO2021/141539

PCT Pub. Date: Jul. 15, 2021

(65) Prior Publication Data

US 2023/0039455 A1 Feb. 9, 2023

Related U.S. Application Data

(60) Provisional application No. 62/959,460, filed on Jan. 10, 2020.

(51) Int. Cl.
*B01L 3/00* (2006.01)

(52) U.S. Cl.
CPC ... *B01L 3/502761* (2013.01); *B01L 3/502776* (2013.01); *B01L 2200/0652* (2013.01); *B01L 2400/0487* (2013.01); *B01L 2400/086* (2013.01)

(58) Field of Classification Search
CPC ......... B01L 3/502761; B01L 3/502776; B01L 2200/0652; B01L 2400/0487; B01L 2400/086; G01N 33/48707; G01N 33/49
See application file for complete search history.

(56) References Cited

U.S. PATENT DOCUMENTS

2006/0223178 A1* 10/2006 Barber .................. C12M 35/06 435/372
2011/0289043 A1* 11/2011 Suresh ............. B01L 3/502746 703/2

OTHER PUBLICATIONS

Kwek K. Z. et al., Asymmetrical Deterministic Lateral Displacement Gaps for Dual Functions of Enhanced Separation and Throughput of Red Blood Cells. Scientific Reports, 1 O Mar. 2016, vol. 6, p. 22934 [Retrieved on Mar. 18, 2021] <DOI: 10.1038/SREP22934> eq. 1 and 3 (Year: 2016).*

(Continued)

*Primary Examiner* — Jennifer Wecker
*Assistant Examiner* — Britney N. Washington
(74) *Attorney, Agent, or Firm* — The Webb Law Firm

(57) ABSTRACT

The invention is to provide a method of profiling a sample comprising a plurality of cells, the method comprising: flowing cells from the sample through a first array of pillars to obtain one or more distribution profiles of cells sorted by the first array; flowing cells from the sample through a second array of pillars that is different from the first array of pillars to obtain on one or more distribution profiles of cells sorted by the second array; and deriving a biophysical signature of the sample based on at least the one or more distribution profiles of the cells sorted by the first array and/or the one or more distribution profiles of the cells sorted by the second array. The method further comprises determining a health status of a subject based on the biophysical signature of the sample. The invention is also to provide a sample profiling system. In various embodiments, (Continued)

(b)

the distribution profile of cells in the output regions is indicative of one or more biophysical properties of the cells, which may include the size and deformability of the cells. The pillars in the first array and the second array may have a shape selected from the group consisting of a substantially L shape and a substantially inverse L shape, mirror reflections thereof or combinations thereof.

16 Claims, 17 Drawing Sheets

(56) References Cited

OTHER PUBLICATIONS

Zeming, K., Salafi, T., Chen, CH. et al. Asymmetrical Deterministic Lateral Displacement Gaps for Dual Functions of Enhanced Separation and Throughput of Red Blood Cells. Sci Rep 6, 22934 (2016). <DOI: 10.1038/SREP22934> eq. 1 and 3 (Year: 2016).*

International Search Report and Written Opinion for Int'l Application No. PCT/SG2021/050011, titled: A Method of Profiling a Sample Comprising a Plurality of Cells and a System for Performing the Same, Dated: Mar. 22, 2021.

Kwek, K.Z. et al., "Asymmetrical Deterministic Lateral Displacement Gaps for Dual Functions of Enhanced Separation and Throughput of Red Blood Cells," Scientific Reports, vol. 6, p. 22934, eq. 1 and 3 (Mar. 10, 2016).

* cited by examiner

Table 1

METHOD OF PROFILING A SAMPLE COMPRISING A PLURALITY OF CELLS AND A SYSTEM FOR PERFORMING THE SAME

This application is the U.S. National Stage of International Application No. PCT/SG2021/050011, filed on Jan. 8, 2021, which designates the U.S., published in English, and claims the benefit of U.S. Provisional Application No. 62/959,460, filed on Jan. 10, 2020. The entire teachings of the above applications are incorporated herein by reference.

TECHNICAL FIELD

The present disclosure relates broadly to a method of profiling a sample comprising a plurality of cells and a system for profiling said sample.

BACKGROUND

The immune response is a dynamic system primed to resolve exogeneous or endogenous triggers such as cancers, infections, toxins, cardiovascular diseases, diabetes, etc. Despite advances in disease diagnostics, the main culprit for disease manifestation, severity and death is 15 the hyper-aggressive host immune response in most instances. In the example of severe COVID-19 infection, the leading cause of death is sepsis (dysregulated immune response) while existing risk stratification methods based on age and co-morbidity remains challenging and imprecise.

The status of the patients' immune response can quickly change in a matter of minutes, therefore assays which are able to rapidly inform on the state of the immune system are vital in early triage among patients with acute infection, as well as prediction of downstream deterioration of disease. This enables delivery of appropriate medical response, particularly in the emergency department (ED), for timely intervention before immune dysregulation becomes clinically evident and requiring admission to the intensive care unit (ICU).

Unlike patients in the ICU who almost always have clear clinical manifestations of disease severity and organ dysfunction (e.g. low blood pressure, decreased oxygenation, jaundice, low urine output), those in the ED frequently show non-specific symptoms and signs, which pose a challenge for physicians to assess the presence of infection and possibility of deterioration into organ dysfunction.

Current investigations for profiling the immune system and its activity include measurement of leukocytes gene expression, cell-surface biochemical markers and blood serum cytokine profile. Studies using a 'sample-sparing assay' where leukocytes can be extracted from small volumes of blood for immediate downstream tests of biochemical secretions and electrical properties were also recently carried out. Furthermore, a neutrophil motility measurement to correlate sepsis in patients within ICU and heightened immune migration activity was also developed. Unfortunately, the majority of these methods generally require sample dilution or pre-processing steps, as well as laborious, costly equipment and antibody labelling procedures. In most cases, returning results requires at least a few hours, which is a significant drawback in terms of their clinical utility for rapid triage and limit the implementation as routine practice within the emergency department or ICU. In addition, standard sample processing steps such as sample dilution, antibody labelling, and blood lysis centrifugation, could trigger changes in native immune cell activity which convolutes the immune profiling.

In view of the above, there is a need to address or at least ameliorate the above-mentioned problems. In particular, there is a need to provide a method of profiling a sample comprising a plurality of cells and a system for performing the same that address or at least ameliorate the above-mentioned problems.

SUMMARY

In one aspect, there is provided a method of profiling a sample comprising a plurality of cells, the method comprising:

flowing cells from the sample through a first array of pillars to obtain one or more distribution profiles of cells sorted by the first array;

flowing cells from the sample through a second array of pillars that is different from the first array of pillars to obtain on one or more distribution profiles of cells sorted by the second array; and deriving a biophysical signature of the sample based on at least the one or more distribution profiles of the cells sorted by the first array and/or the one or more distribution profiles of the cells sorted by the second array.

In one embodiment, flowing cells through the first array of pillars comprises flowing the cells through the first array of pillars at different flow velocities and flowing cells through the second array of pillars comprises flowing the cells through the second array of pillars at different flow velocities or flow rates.

In one embodiment, obtaining a first biophysical parameter based on the one or more distribution profiles of the cells sorted by the first array and/or obtaining a second biophysical parameter based on one or more distribution profiles of the cells sorted by the second array.

In one embodiment, obtaining the first biophysical parameter and/or second biophysical parameter comprises determining a cell apparent size ($D_{app}$) based on the one or more distribution profiles of the sorted cells, optionally determining respective cell apparent sizes ($D_{app}$) based on the respective distribution profiles of the sorted cells at the respective different flow velocities or flow rates.

In one embodiment, obtaining the first biophysical parameter and/or the second biophysical parameter further comprises obtaining a cell-deformability modulus (CDM), optionally based on changes in the cell apparent sizes ($D_{app}$) at different flow velocities or flow rates.

In one embodiment, the biophysical signature of the sample is derived from the respective cell-deformability modulus (CDM) obtained for at least the first array of pillars and the second array of pillars.

In one embodiment, the pillars of each the first and second arrays are arranged based on equation (A):

$$Dc = ag \tan \ominus^{b} \qquad \text{(A)}$$

where $D_c$ is the deterministic lateral displacement (DLD) cut-off size, each of a and b is a value that is independently selected from a value in the range of 0.48 to 1.4 and g represents the closest distance between the pillars.

In one embodiment, $D_c$ is in the range of 5.0 μm to 16.0 μm.

In one embodiment, the first array of pillars differs from the second array of pillars in at least one of: pillar dimension, pillar shape, pillar structure, pillar arrangement or pillar orientation, with respect to the direction of flow of cells.

In one embodiment, the pillars in the first array and the second array have a shape selected from the group consisting of a substantially L shape (L), a substantially inverse L shape ($L^{-1}$), mirror reflections thereof or combinations thereof.

In one embodiment, the sample is derived from a mammalian subject and the method further comprises determining a health status of a subject based on the biophysical signature of the sample.

In one embodiment, determining a health status of a subject comprises determining the presence of an infection in the subject.

In one embodiment, the cells comprise immune cells.

In one aspect, there is provided a sample profiling system comprising: a first region comprising a first array of pillars configured to sort cells from a sample flowed therethrough and provide one or more distribution profiles of the sorted cells; and a second region comprising a second array of pillars configured to sort cells from the sample flowed therethrough and provide one or more distribution profiles of the sorted cells;

wherein the first array of pillars is configured to provide one or more distribution profiles that is substantially different from the one or more distribution profiles provided by the second array of pillars for the same sample.

In one embodiment, each of the first and second regions is fluidically coupled to at least one input reservoir and at least one output port.

In one embodiment, the pillars of each the first and second array are arranged based on equation (A):

$$Dc = ag \tan \Theta^{b} \quad \text{(A)}$$

where $D_c$ is the deterministic lateral displacement (DLD) cut-off size, each of a and b is a value that is independently selected from a value in the range of 0.48 to 1.4 and g represents the closest distance between the pillars.

In one embodiment, the first region comprising the first array of pillars and the second region comprising the second array of pillars each comprise a plurality of segments, each segment differing from the adjacent segment by the offsetting angle of the pillars (θ) and the corresponding DLD cut-off size ($D_c$).

In one embodiment, $D_c$ is in the range of 5.0 μm to 16.0 μm.

In one embodiment, the first array of pillars differs from the second array of pillars in at least one of: pillar dimension, pillar shape, pillar structure, pillar arrangement or pillar orientation, with reference to the direction of flow of cells.

In one embodiment, the system further comprises at least one detection setup for obtaining the one or more distribution profiles of the cells sorted by the first array and/or second array.

Definitions

The term "micro" as used herein is to be interpreted broadly to include a dimension less than about 1000 μm. Accordingly, the term "micropillar" and the like as used herein may include a structure having at least one dimension that is less than about 1000 μm, less than about 900 μm, less than about 800 μm, less than about 700 μm, less than about 600 μm, less than about 500 μm, less than about 400 μm, less than about 300 μm, less than about 200 μm, less than about 100 μm, less than about 90 μm, less than about 80 μm, less than about 70 μm, less than about 60 μm, less than about 50 μm.

The term "microfluidics" or variants thereof refers broadly to the engineering or use of devices that apply fluid flow to channels smaller than 1 millimetre in at least one dimension.

The terms "coupled" or "connected" as used in this description are intended to cover both directly connected or connected through one or more intermediate means, unless otherwise stated.

The term "associated with", used herein when referring to two elements refers to a broad relationship between the two elements. The relationship includes, but is not limited to a physical, a chemical or a biological relationship. For example, when element A is associated with element B, elements A and B may be directly or indirectly attached to each other or element A may contain element B or vice versa.

The term "adjacent" used herein when referring to two elements refers to one element being in close proximity to another element and may be but is not limited to the elements contacting each other or may further include the elements being separated by one or more further elements disposed therebetween.

The term "and/or", e.g., "X and/or Y" is understood to mean either "X and Y" or "X or Y" and should be taken to provide explicit support for both meanings or for either meaning.

Further, in the description herein, the word "substantially" whenever used is understood to include, but not restricted to, "entirely" or "completely" and the like. In addition, terms such as "comprising", "comprise", and the like whenever used, are intended to be non-restricting descriptive language in that they broadly include elements/components recited after such terms, in addition to other components not explicitly recited. For example, when "comprising" is used, reference to a "one" feature is also intended to be a reference to "at least one" of that feature. Terms such as "consisting", "consist", and the like, may in the appropriate context, be considered as a subset of terms such as "comprising", "comprise", and the like. Therefore, in embodiments disclosed herein using the terms such as "comprising", "comprise", and the like, it will be appreciated that these embodiments provide teaching for corresponding embodiments using terms such as "consisting", "consist", and the like. Further, terms such as "about", "approximately" and the like whenever used, typically means a reasonable variation, for example a variation of +/−5% of the disclosed value, or a variance of 4% of the disclosed value, or a variance of 3% of the disclosed value, a variance of 2% of the disclosed value or a variance of 1% of the disclosed value.

Furthermore, in the description herein, certain values may be disclosed in a range. The values showing the end points of a range are intended to illustrate a preferred range. Whenever a range has been described, it is intended that the range covers and teaches all possible sub-ranges as well as individual numerical values within that range. That is, the end points of a range should not be interpreted as inflexible limitations. For example, a description of a range of 1% to 5% is intended to have specifically disclosed sub-ranges 1% to 2%, 1% to 3%, 1% to 4%, 2% to 3% etc., as well as individually, values within that range such as 1%, 2%, 3%, 4% and 5%. The intention of the above specific disclosure is applicable to any depth/breadth of a range.

Additionally, when describing some embodiments, the disclosure may have disclosed a method and/or process as a particular sequence of steps. However, unless otherwise required, it will be appreciated that the method or process should not be limited to the particular sequence of steps disclosed. Other sequences of steps may be possible. The particular order of the steps disclosed herein should not be construed as undue limitations. Unless otherwise required, a method and/or process disclosed herein should not be limited to the steps being carried out in the order written. The sequence of steps may be varied and still remain within the scope of the disclosure.

Furthermore, it will be appreciated that while the present disclosure provides embodiments having one or more of the features/characteristics discussed herein, one or more of these features/characteristics may also be disclaimed in other alternative embodiments and the present disclosure provides support for such disclaimers and these associated alternative embodiments.

DESCRIPTION OF EMBODIMENTS

Exemplary, non-limiting embodiments of a method of profiling a sample comprising a plurality of cells and a system for performing the same are disclosed hereinafter.

There is provided a method of profiling a sample comprising a plurality of cells, the method comprising flowing cells from the sample through a first arrangement or array of pillars to obtain one or more distribution profiles of the cells sorted by the first arrangement or array; flowing cells from the sample through a second arrangement or array of pillars that is different from the first arrangement or array of pillars to obtain on one or more distribution profiles of the cells sorted by the second arrangement or array; and deriving a biophysical signature of the sample based on at least the one or more distribution profiles of the cells sorted by the first arrangement or array and/or the one or more distribution profiles of the cells sorted by the second arrangement or array. Advantageously, in various embodiments, the method provides for rapid sample profiling, such as immune profiling. Thus, embodiments of the method may, for example, allow for early sepsis patient triage and provide clinicians with new insights to the immune activity of the patient at point-of-care.

In various embodiments, the step of flowing cells through the array of pillars comprises flowing the sample through a region comprising the array of pillars to sort the cells to different output portions/parts/areas of the region; and obtaining the distribution profile of the cells in the different output portions/parts/areas of the region. Each different array of pillars may be disposed in a respective different region (i.e., through which the sample is to be flowed through) and therefore may also comprise respective output portions/parts/areas of the region (i.e. to which the cells are to be sorted to).

Accordingly, when multiple different arrays of pillars are present, multiple regions comprising pillars may also be present and the flowing and obtaining steps may be repeated for a second, third, fourth or subsequent/multiple regions etc, to obtain distribution profiles of the cells in the different output portions/parts/areas of the respective regions. Accordingly, the sample may be profiled based on the one or more distribution profiles in the different output portions/parts/areas of each region. In various embodiments, the different regions and/or different arrays are arranged in a manner that does not allow continuous flow of cells from one region to another or from one array to another automatically. For example, there may be absent a continuous flow path for cell flow from first region to the second region and/or from the first array to the second array. Accordingly, in various embodiments, flowing cells through one region or one array is a separate step from a subsequent step of flowing cells through another different region or another different array.

Therefore, in various embodiments, the method comprises (i) flowing cells obtained from the subject through a first region comprising a first array of pillars to sort cells to different output portions/parts/areas of the first region; (ii) obtaining a first distribution profile of cells in the different output portions/parts/areas of the first region; (iii) repeating steps (i) to (ii) with a second region comprising a second array of pillars to obtain a second distribution profile of cells in different output portions/parts/areas of the second region; (iv) optionally repeating steps (i) to (ii) with a third and/or subsequent/multiple regions; and (v) deriving a biophysical signature of the sample based on at least the first and/or second distribution profiles of cells. In various embodiments, the distribution profile of cells in the output regions is indicative of one or more biophysical properties of the cells. In various embodiments, the method is based on the characterization/profiling of the biophysical properties of the cells in the sample and is thus substantially devoid of detection of sample borne pathogens, sample biochemical molecules and cell surface markers. The one or more biophysical properties of the cells may include but is not limited to the size (e.g. apparent size) and deformability of the cells. Obtaining the distribution profile may therefore comprises measuring cell count and determining size distribution of the cell type for example, at the different output portions/parts/areas. The output portions/parts/areas of each region may comprise a plurality of sub-channels. The one or more biophysical properties of the cell type may be measured using a means for counting/determining the number of cells passing each of the different output portions/parts/areas of each region. For example, the means for counting/determining the number of cells may be a high-speed camera/a smartphone camera/a machine vision camera/an electrode system or the like.

The different arrays of pillars may be contained in the same device or in different devices. For example, when the first and second array of pillars are respectively contained in different devices, the first region comprising the first array of pillars may be located within e.g., a first microfluidic device and the second region comprising the second array of pillars may be located within e.g., a second microfluidic device. Similarly, when a third, a fourth or subsequent regions etc, each comprising pillar arrays is present, each of these regions may be located in separate and different microfluidic devices.

Alternatively, the first region comprising the first array of pillars and the second region comprising the second array of pillars may be located within one microfluidic device. In one example, the first region and the second region form a series in a microfluidic channel. In another example, the first region and the second region are parallel to each other/are located within separate microfluidic channels. The method/system may also comprise a third, a fourth or subsequent regions etc, each comprising pillar arrays and each of these regions may be located in the same microfluidic device.

In various embodiments, flowing cells through the first array of pillars comprises flowing the cells through the first array of pillars at different flow velocities. Likewise, flowing cells through the second array of pillars (or subsequent arrays e.g., third, fourth, fifth arrays etc) may comprise flowing the cells through the second array of pillars at different flow velocities or flow rates. In various embodiments, the method is performed with at least two or more different flow velocities or flow rates e.g. at least 2, at least 3, at least 4, at least 5, at least 6, at least 7, at least 8, at least 9, or at least 10. In various embodiments, flow velocities is in the range of from about 1.0 mm/s to about 1000.0 mm/s, from about 1.0 mm/s to about 900.0 mm/s, from about 1.0 mm/s to about 800.0 mm/s, from about 1.0 mm/s to about 700.0 mm/s, from about 1.0 mm/s to about 600.0 mm/s, from about 1.0 mm/s to about 500.0 mm/s, from about 10.0 mm/s to about 450.0 mm/s, from about 20.0 mm/s to about 400.0 mm/s, from about 30.0 mm/s to about 350.0 mm/s, from about 40.0 mm/s to about 300.0 mm/s, from about 1.5 mm/s to about 250.0 mm/s, from about 2.0 mm/s to about 200.0 mm/s, from about 2.0 mm/s to about 150.0 mm/s, from about 1.0 mm/s to about 100.0 mm/s, from about 2.0 mm/s to about 50.0 mm/s, from about 2.0 mm/s to about 40.0 mm/s, from about 2.0 mm/s to about 35.0 mm/s, or from about 2.0 mm/s to about 30.0 mm/s. In various embodiments, the flow velocity is at least one of about 2.5 mm/s, about 5.0 mm/s, about 10.0 mm/s or about 25.0 mm/s. In some embodiments, the method is performed with one/single flow velocity or flow rate.

In various embodiments, flow rates is in the range of from about 1.0 μL/min to about 100.0 μL/min, from about 1.0 μL/min to about 90.0 μL/min, from about 1.0 μL/min to about 80.0 μL/min, from about 1.0 μL/min to about 70.0 μL/min, from about 1.0 μL/min to about 60.0 μL/min, from about 1.0 μL/min to about 50.0 μL/min, from about 1.2 μL/min to about 45.0 μL/min, from about 1.4 μL/min to about 40.0 μL/min, from about 1.6 μL/min to about 35.0 μL/min, from about 1.8 μL/min to about 30.0 μL/min, from about 2.0 μL/min to about 28.0 μL/min, from about 2.2 μL/min to about 26.0 μL/min, or from about 2.5 μL/min to about 25.0 μL/min. In various embodiments, the flow rate is at least one of about 2.5 μL/min, about 5.0 μL/min, about 10.0 μL/min or about 25.0 μL/min.

In various embodiments, the method further comprising obtaining a first biophysical parameter based on the one or more distribution profiles of the cells sorted by the first array and/or obtaining a second biophysical parameter based on one or more distribution profiles of the cells sorted by the second array. Thus, obtaining the biophysical signature of the sample may be based on the first and/or second biophysical parameters. In various embodiments, obtaining the biophysical parameter (e.g., first biophysical parameter and/or the second biophysical parameter etc) comprises determining a cell apparent size ($D_{app}$) based on the distribution profile of the sorted cells. Accordingly, the biophysical parameter may comprise a value that is associated with the cell apparent size ($D_{app}$) or a parameter that is derived/derivable from the $D_{app}$ e.g. change in $D_{app}$. The $D_{app}$ may be obtained based on the respective distribution profiles of the sorted cells at the respective different flow velocities. In various embodiments, obtaining the biophysical parameter (e.g., first biophysical parameter and/or the second biophysical parameter etc) comprises obtaining a cell-deformability modulus (CDM). The CDM may be based on changes/differences in the cell apparent sizes ($D_{app}$) at different flow velocities. Accordingly, the biophysical parameter may comprise a value that is associated with the cell-deformability modulus (CDM) or a parameter that is derived/derivable from the CDM.

In various embodiments, the biophysical signature of the sample is derived from the respective cell-deformability modulus (CDM) (or associated values) obtained for at least the first array of pillars and/or the second array of pillars. In various embodiments, the biophysical signature may be obtained by finding the product of values associated with the respective cell-deformability modulus (CDM) obtained for the different arrays of pillars, for example, at least the first array of pillars and the second array of pillars.

In various embodiments, the pillars (e.g. of the first and/or second arrays etc) are arranged based on equation (A):

$$Dc = ag\tan\ominus b \qquad \text{(A)}$$

where $D_c$ is the deterministic lateral displacement (DLD) cut-off size, each of a and b is a value that is independently selected from a value in the range of 0.48 to 1.4 and g represents the closest distance between the pillars. $D_c$ may be in the range of from about 5.0 μm to about 16.0 μm, from about 6.0 μm to about 16.0 μm, from about from about 7.0 μm to about 15.0 μm, from about 8.0 μm to about 14.0 μm, from about 9.0 μm to about 13.0 μm, from about 10.0 μm to about 12.0 μm.

In various embodiments, the pillars (e.g. of the first and/or second arrays etc) are arranged based on equation (B):

$$Dc = 1.4g\tan\ominus^{0.48} \qquad \text{(B)}$$

where $D_c$ is the deterministic lateral displacement (DLD) cut-off size, g is the closest distance between the pillars and 8 is the offsetting angle of the pillars.

In various embodiments, the method further comprises the step of determining a corresponding measured cell apparent size ($D_{app}$) or a value associated thereof for each output portions/parts/areas of each region. The method may include passing spherical beads of known different/varying sizes through the region comprising the array of pillars to sort the beads to different output portions/parts/areas of the region and attributing a value or a corresponding measured cell apparent size ($D_{app}$) to the different output portions/parts/areas of the region based on the sizes of the beads sorted to the respective output portions/parts/areas.

When a plurality of different arrays of pillars is present, the arrays may differ one another in at least one of: pillar dimension, pillar shape, pillar structure, pillar arrangement or pillar orientation, with respect to the direction of flow of cells. In other words, the pillars within a first array may differ from the pillars within a second array in at least one of the characteristics described above. For example, the pillars within the first array may have the same or substantially similar dimension, shape and structure but may have a different orientation from the pillars within the second array (e.g. with respect to the inflow of cells). The difference in orientation may be due to a rotation of the pillars (i.e. rotationally different) at an angle of from about 1° to about 359°, from about 10° to about 350°, from about 20° to about 340°, from about 30° to about 330°, from about 40° to about 320°, from about 50° to about 310°, from about 60° to about 300°, from about 70° to about 290°, from about 80° to about 280°, or from about 90° to about 270° (for e.g., about 180°).

In various embodiments, although the pillars within a first array may differ from the pillars within a second array, each of the first and second array within the first and second regions respectively may still provide similar or substantially the same DLD cutoff sizes ($D_c$), for example, when tested with non-deformable (e.g., rigid) spherical beads. In other words, the first and second arrays may both be arranged based on equations (A) or (B) with similar/identical parameters including gaps, offsets etc (e.g., parameters a, g, θ, b of the equations (A) and (B)) but the pillars for each array may instead differ in terms of their physical structures exhibited to the flow of cells, resulting in different physical interactions with the cells which may then attribute different levels/degree of deformity of the cells between the arrays during flow. In various embodiments, the first and second arrays may both alternatively be arranged based on equations (A) or (B) with different parameters including gaps, offset angles etc (e.g., parameters a, g, θ, b of the equations (A) and (B)). For example, the arrays may differ in pillar arrangement which may include, but is not limited to, differences in offset angles. Accordingly, in various embodiments, the first array of pillars is configured to generate one or more distribution profiles that is substantially different from the one or more distribution profiles generated by the second array of pillars for the same sample.

The pillars may be symmetric or asymmetric in shape. In various embodiments, where the pillars are symmetrical in shape, the pillars may have no more than 1 line of symmetry, no more than 2 lines of symmetry, no more than 3 lines of symmetry or no more than 4 lines of symmetry. In various embodiments, the pillars in the first array of pillars and the pillars in the second array of pillars are asymmetric in shape. The pillars may be selected from one or more of the shapes (e.g. crossectional shape) shown in FIG. 16.

The pillars in the first array of pillars and the pillars in the second array of pillars may be mirror images of each other. The pillars in the first array of pillars and the pillars in the second array of pillars may have a substantially L shape (L), a mirror reflection of a substantially L shape, a substantially inverse L shape (e.g. an inverted L shape ($L^{-1}$)) or mirror reflections thereof. In various embodiments, the pillars in the first array of pillars and/or the pillars in the second array of pillars have two longitudinal sections/segments abutting each other (for e.g. an L shape or a T shape). The pillars in the first array of pillars and/or the pillars in the second array of pillars may have at least one curved surface. The curved surface may be one that extends from one end of a first longitudinal section/segment to another end of a second longitudinal section/segment (e.g. see shapes number 5 and 6 of FIG. 16). It should be appreciated that while curved surfaces may offer certain advantages, the absence of a curved surface may also work. Therefore, in some embodiments, the pillars may be devoid of curved surfaces and comprise only corners and/or flat surfaces. In some embodiments, the pillars in the first array of pillars and/or the pillars in the second array of pillars have at least one pillar protrusion. The pillars in the first array of pillars and/or the pillars in the second array of pillars may have at least one groove. In one example, the at least one groove has a shape of a quadrant (e.g. see shapes number 5 and 6 of FIG. 16).

In various embodiments, the pillars are microstructures e.g. micropillars. Thus, in various embodiments, the dimensions of the pillars are in the μm range for example, the dimensions of the pillars may be less than about 1000 μm, less than about 900 μm, less than about 800 μm, less than about 700 μm, less than about 800 μm, less than about 700 μm, less than about 600 μm, less than about 500 μm, less than about 400 μm, less than about 300 μm, less than about 200 μm, less than about 100 μm, less than about 90 μm, less than about 80 μm, less than about 70 μm, less than about 60 μm, less than about 50 μm, less than about 40 μm, less than about 30 μm, less than about 20 μm, or less than about 15 μm.

In various embodiments, the sample is a biological sample. In various embodiments, the sample is derived from a mammalian subject. In one example, the biological sample is blood. The sample may be substantially free of externally added tags or labels (i.e. label free). The sample may also be undiluted/untreated. In various embodiments, there may be no need for additional laboratory equipment to pre-process the sample. Advantageously, in various embodiments, the method does not require additional and time-consuming steps to label and treat/process the sample prior to profiling.

Accordingly, in various embodiments, the method may be carried out quickly and efficiently. The method may be carried out in no more than about 15 minutes, no more than about 10 minutes or no more than about 5 minutes.

In various embodiments, the method may be performed using a small volume of sample. For example, the volume of the sample used may be no more than about 20 μl, no more than about 15 μl, or no more than about 10 μl. Advantageously, the burden in obtaining a large amount of sample from the subject/patient is drastically reduced.

In various embodiments, the method comprises determining a health status of a subject based on the biophysical signature of the sample. Therefore, the method may be adapted to prognose or diagnose a condition (e.g. an inflammatory condition), for example an infection such as a viral infection (e.g. common cold virus, rhinovirus, adenovirus, influenza virus, para-influenza virus, respiratory syncytial virus, enterovirus or a coronavirus infection such as SARS-COV SARS-COV-2, MERS-COV etc), a bacterial infection (e.g. Gram negative bacterial infection such as from Enterobacteriales, Bacteroidales, Legionellales, Neisseriales, *Pseudomonas*, Vibrionales, Pasteurellales and Camylobacterales etc or a Gram positive bacterial infection such as from Bacillales, Lactobacillies, *Staphylococcus, Streptococcus, Enterococcus* and *Listeria* etc). In various embodiments, the method is adapted to prognose or diagnose sepsis. The method may also be adapted to prognose or diagnose a disease, for example, a disease that affects the mechanical properties of the blood cells such as malaria, or a blood condition, for example, thalassemia, anemia (e.g. hemolytic anemia, sickle cell anaemia, megaloblastic anemia, iron deficiency anemia, microangiopathic hemolytic anemia, mechanical hemolytic anemia, sideroblastic anemia and autoimmune hemolytic anemia etc), anisocytosis, poikilocytosis, spherocytosis, ovalocytosis, elliptocytosis, hemoglobinopathies, disseminated intravascular coagulation, hyperglobulinemia, hyperfibrinogenaemia and stomatocytosis etc. In various embodiments, the method is adapted to prognose or diagnose a health condition that is manifested by changes in one or more properties of cells found in the biological fluid of the subject (e.g., blood). In various embodiments, the method comprises determining the presence of an infection in the subject. In various embodiments, the method is capable of detecting if the subject belongs to a group having an infection (e.g., infection group) or a group not having an infection (e.g., non-infection group). The method may therefore have a detection sensitivity of no less than about 0.75, about 0.80, about 0.85, about 0.90 (e.g. about 0.91) and/or a specificity of no less than about 0.75, about 0.80, about 0.85, about 0.90 (e.g. about 0.92). Determining the health status of the subject may further comprise the step of comparing the two or more distribution profiles of cells obtained from the subject with a reference or a reference value. The reference or reference value may be based on two or more distribution profiles of cells obtained from a reference subject (e.g., a healthy subject).

The method may be an in vitro or ex vivo method.

The cell type present in the sample that is used for profiling may be one of immune cells, leukocytes, red blood cells, stem cells, cancer cells, algae, yeast, Chinese Hamster Ovary (CHO) cells or combinations thereof. In various embodiments, the cells have a size of no less than about 3 μm, no less than about 4 μm, no less than about 5 μm or no less than about 6 μm. This may be useful, for example, when the cells are mammalian cells and the method pertains to prognosis of sepsis. In other examples, the method may also be carried out for cells which are less than about 3 μm, for instance, when the method is directed at yeast cells which are slightly smaller than 3 microns. In some embodiments, the method may also be capable of detecting changes in cell samples that are of less than 1 micron in size.

There is also provided a system for profiling a sample comprising a plurality of cells. The system may be a sample profiling system. The system may be capable of performing embodiments of the method provided herein. Accordingly, the system may contain one or more structural elements/features that are adapted to perform one of more steps of the method provided herein. In various embodiments, the system comprises a first region comprising the first array of pillars for sorting cells flowed therethrough; and a second region comprising the second array of pillars sorting cells flowed therethrough, wherein the first array of pillars and the second array of pillars are different. The first array may be configured to sort cells from the sample flowed therethrough and produce/generate one or more distribution profiles of the sorted cells. Likewise, the second array may be configured to sort cells from the sample flowed therethrough and produce/generate one or more distribution profiles of the sorted cells. In various embodiments, the first array of pillars is configured to produce/generate one or more distribution profiles that is substantially different from the one or more distribution profiles produced/generated by the second array of pillars for the same sample.

In various embodiments, the region comprising the array of pillars (e.g. each of the first and second regions) is fluidically coupled to at least one input reservoir and at least one output port. In some embodiments, each region is fluidically coupled to at least three input reservoirs/ports and one output port.

The pillars of each the first and second array of the system may be arranged based on equation (A):

$$Dc = ag \tan \theta b \qquad (A)$$

where $D_c$ is the deterministic lateral displacement (DLD) cut-off size, each of a and b is a value that is independently selected from a value in the range of 0.48 to 1.4 and g represents the closest distance between the pillars. $D_c$ may be in the range of from about 5.0 μm to about 16.0 μm, from about 6.0 μm to about 16.0 μm, from about from about 7.0 μm to about 15.0 μm, from about 8.0 μm to about 14.0 μm, from about 9.0 μm to about 13.0 μm, from about 10.0 μm to about 12.0 μm. Equation (A) may be used for calibration with spherical beads to get the actual performance/characteristic of the device/system.

In various embodiments, the pillars (e.g. of the first and/or second arrays etc) of the system are arranged based on equation (B):

$$Dc = 1.4g \tan \theta^{0.48} \qquad (B)$$

where $D_c$ is the deterministic lateral displacement (DLD) cut-off size, g is the closest distance between the pillars and θ is the offsetting angle of the pillars.

In various embodiments, the region comprising the pillars (e.g. each of the first and second regions) comprises a plurality of segments, each segment differing from the adjacent/neighbouring segment by the offsetting angle of the pillars (e) and the corresponding DLD cut-off size ($D_c$). In some embodiments, each of the first region and the second region comprises at least about 10 segments, at least about 11 segments, at least about 12 segments, at least about 13 segments, at least about 14 segments, at least about 15 segments, at least about 16 segments, at least about 17 segments, at least about 18 segments, at least about 19 segments, at least about 20 segments, at least about 21 segments, at least about 22 segments, at least about 23 segments, at least about 24 segments, or at least about 25 segments. Each of the first region and the second region may comprise no less than 2 segments, no less than 3 segments, no less than 4 segments, no less than 5 segments, no less than 6 segments, no less than 7 segments, no less than 8 segments, no less than 9 segments, no less than about 10 segments, and no more than about 25 segments, no more than about 40 segments or no more than about 100 segments. Each segment may differ from the adjacent/neighbouring segments in the pillar row-shift gradient/offsetting angle of the pillars and the corresponding DLD cut-off size (ranging from about 6.0 μm to about 15.0 μm) in steps of about 0.5 μm.

In various embodiments, the array of pillars in each region is disposed on a microfluidic device. The microfluidic device may be fabricated from/comprises a polymer, such as a synthetic polymer/elastomer. In one example, the microfluidic device is fabricated from/comprises polydimethylsiloxane (PDMS). The microfluidic device may be fabricated using one of injection molding and imprint lithography. It will be appreciated that other fabrication techniques such as 3D printer technology, CNC (computer numerical control) machining etc may also be employed. Similarly, plastics (biodegradable or not), glass (silica, quartz) etc may also be used to fabricate the microfluidic device/system.

When a plurality of different arrays of pillars are present, the arrays may differ one another in at least one of: pillar dimension, pillar shape, pillar structure, pillar arrangement or pillar orientation, with respect to the direction of flow of cells. For example, the first array of pillars may differ from the second array of pillars in pillar shape, pillar arrangement and/or pillar orientation, with reference to the direction of flow of cells. The pillars present in the system may also comprise one or more characteristics of the pillars aforementioned.

The system may be a single device or an arrangement of a plurality of devices. Accordingly, the different regions or arrays of pillars may be contained in the same device or in different devices. For example, when the first and second array of pillars are respectively contained in different devices, the first region comprising the first array of pillars may be located within e.g., a first microfluidic device and the second region comprising the second array of pillars may be located within e.g., a second microfluidic device. Similarly, when a third, a fourth or subsequent regions etc, each comprising pillar arrays is present, each of these regions may be located in separate and different microfluidic devices.

Alternatively, the first region comprising the first array of pillars and the second region comprising the second array of pillars may be located within one single microfluidic device. In one example, the first region and the second region form a series in a microfluidic channel. In another example, the first region and the second region are parallel to each other/are located within separate microfluidic channels. The method/system may also comprise a third, a fourth or subsequent regions etc, each comprising pillar arrays and each of these regions may be located in the same microfluidic device. In various embodiments, the system may have a single inlet and/or common inlet(s) for the one or more regions.

In various embodiments, the different regions and/or different arrays are arranged in a manner that does not allow continuous flow of cells from one region to another or from one array to another automatically. For example, there may be absent a continuous flow path for cell flow from first region to the second region and/or from the first array to the second array. Accordingly, the first and second regions and/or the first and second arrays are disposed at disconnected/disjointed parts of the system.

The system may further comprise at least one detection setup for obtaining one or more distribution profiles of the cells sorted by the first array and/or second array. The detection setup may provide a means for counting/determining the number of cells passing each of the different output portions/parts/areas of each region. For example, the means for counting/determining the number of cells may be a high-speed camera/a smartphone camera/a machine vision camera/an electrode system. When using a high-speed camera, the frame rate used may be from about 15 frames per second (fps) to about 250 fps, e.g. including 15, 30, 60, 90, 120, 150, 180, 210 and 240 fps. The frame rate may be determined based on one of the flow rate of the sample/cells and device field of view. For example, the frame rates of 15 fps, 30 fps, 60 fps and 150 fps may be used for flow rates of 2.5 mm/s, 5.0 mm/s, 10.0 mm/sand 25.0 mm/s respectively.

In various embodiments, the method and system provided herein are based on a deterministic lateral displacement (DLD) technique/method. In various embodiments, the method and system provided herein are able to, but are not limited to, providing a rapid biophysical blood immune-profiling, by measuring unique size and deformability parameters of cells, e.g. white blood cells (WBCs) from undiluted whole blood samples and by performing immuno-profiling of leukocytes. In some embodiments, the method and system provided herein are able to, but are not limited to, differentiate various white blood cell (WBC) phenotypes populations that were triggered by blood lysis, temperature, lipopolysaccharides (LPS) and phorbol 12-myristate 13-acetate (PMA) activation directly from whole blood. Accordingly, in some embodiments, patient stratification in the emergency department to independently distinguish patients with infection from non-infection controls may be carried out using embodiments of the method and system disclosed herein. Advantageously, such profiling may be performed in less than 15 minutes from a single drop of blood and using low camera frame rates of 150 frames per second, showing the potential for point-of-care diagnostics for patient triage.

Therefore, in various embodiments, the method and system provided herein may be useful in 1) Point of Care Disease Prognosis such as sepsis prognosis in the Emergency Department; 2) Blood Sparing Assays such as whole blood activation assay with specific antigen inflammation; and/or 3) Real-time patient monitoring in the Intensive Care Unit.

BRIEF DESCRIPTION OF FIGURES

FIG. 1A shows the whole blood DLD assay by loading the blood into the sample reservoir 102A of the PDMS DLD device (or system) 100 which is used to simultaneously sort and measure the distribution of cells across the output region allowing size frequency distribution analysis. The device 100 comprises of two additional buffer reservoirs 102B and 102C which sandwich the sample stream resulting in a precise injection of sample into the DLD region. The DLD region is composed of 21 DLD segments corresponding to 21 step measurement resolution ranging from size 6.0 to 16.0 μmin steps of 0.5 μm. Scale bar is 200 μm. FIG. 1B shows the DLD assay(s) used to profile WBC based on their unique biophysical signatures in the different DLD pillar structures. These biophysical parameters are used to then classify the immune spectrum from healthy to severe immune response.

FIG. 3C introduces the cell DLD-deformability modulus (CDM) parameter where the rate of change of size can be measured by plotting the fitting equations of the size plots for L and $L^{-1}$.

FIG. 4A shows a graph plot of measure apparent size, $D_{app}$, versus size of beads at a flow of 2.5 L/min. Four size standards of 6.2, 7.3, 8.2 and 10.2 μm beads were used to calibrate the devices. Ideally, if the designed specifications of DLD fits perfectly, $D_{app}$ will be equivalent to the size of the beads as depicted in the dotted line. The top half triangular region depicts a condition where $D_{app}$>size of beads and the converse is true for the bottom half triangular region. L and $L^{-1}$ sorting performance of beads are measured in the respective plots. n>200 for each point and error bar is S.D. of sample population. FIG. 4B shows the measurement of mean $D_{app}$ size of beads at various flow velocities. The mean of mean plot shows the average $D_{app}$ for beads flow at various velocities (n=4) and error bar denotes the S.D. of these means.

FIGS. 5A and 5B show the instantaneous simulated flow streamlines around DLD pillars. Magnified experimental time-lapse overlay of individual WBC trajectories and dynamics over L and $L^{-1}$ structures is seen in FIGS. 5C and 5D, respectively. The darker outline and lighter outline are pseudo-shades highlighting experimental WBC sequential motion at two flow rates, $Q_{1=2.5}$ µL/min and $Q_2$=25.0 µL/min, respectively.

FIGS. 7A, 7B, 70, 7D and 7E are graphs and schematic drawings on the measurements performed for and results from DLD assays for WBC biophysical measurements of size and deformability from whole blood in accordance with various embodiments disclosed herein. n=5 healthy donor samples were used to measure the size parameters in FIG. 7A and deformation parameters in FIG. 7B. $D_{app}$ were measured at 2.5 L/min for L and $L^{-1}$ and a paired t-test with  denoting p=0.004. Average $D_{app}$ is the mean of both L and $L^{-1}$ where n=5 and error bar denotes standard deviation of sample. The CDM deformation parameter for L and $L^{-1}$ were plotted in FIG. 7B with * denoting a $p<0.001$ for a paired t-test of n=5 sample. $CDM_{dot}$ is the product of both $CDM_L$ and $CDM_L{}^{-1}$.

FIGS. 10A to 10D show plots for Size 1 to Size 4 features, while FIGS. 10E to 10H show plots for cell Count 1-Count 4, respectively from a list of 38 biophysical markers (see Table 5). The plots compare the mean and sample standard deviation for healthy (n=8) samples, Control (n=36) samples and ≥2 SIRS (n=41) samples. An independent two tailed t-test is used to compute the p-values of the sample measurements with n.s. denoting not significant, * for $p<0.05$,  for $p<0.01$, * for $p<0.001$ and ** for $p<0.0001$. FIG. 101** shows the hierarchical clustering and heatmap of normalized biophysical marker value of all 85 samples comprising healthy, no infection control, infection tests >2 SIRS and severe immune response with >2 SIRS. 8 clusters were identified based on the data and the heatmap shows the corresponding biomarker signatures. The biomarkers are grouped based on size, deformability, distribution and cell count.

EXAMPLES

Figure 1A:
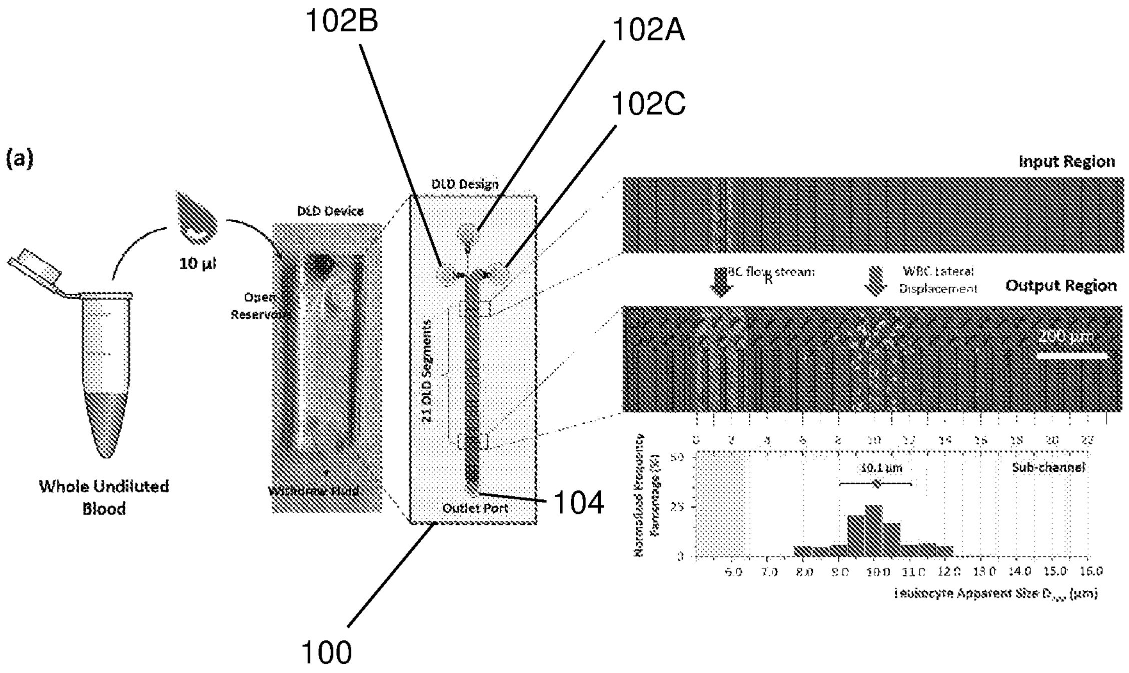
FIGS. 1A and 1B are schematic drawings illustrating a DLD device used for immune cell profiling assay and an immune profiling workflow using DLD assays for L and $L^{-1}$ pillar shapes, respectively, in accordance with various embodiments disclosed herein.

Example embodiments of the disclosure will be better understood and readily apparent to one of ordinary skill in the art from the following discussions and if applicable, in conjunction with the figures. It should be appreciated that other modifications related to biological, chemical, structural, electrical and optical changes may be made without deviating from the scope of the invention. Example embodiments are not necessarily mutually exclusive as some may be combined with one or more embodiments to form new exemplary embodiments.

Disease manifestation and severity from acute infections are often due to hyper-aggressive host immune responses which changes within minutes. Current methods for early diagnosis of infections focus on detecting low abundance pathogens, which are time-consuming, of low sensitivity, and does not reflect the severity of the pathophysiology appropriately.

The examples describe a rapid label-free immune profiling deterministic lateral displacement (DLD) assay as a quantitative diagnostic measure of immune cell biophysical signature using 20 µL of whole undiluted and unprocessed blood in under 15 minutes. The approach here focuses on profiling the rapidly changing host inflammatory response, which in its over-exuberant state, leads to sepsis and death. In embodiments disclosed herein, the assay is based on a simple workflow where whole blood is loaded onto a microfluidic chip (or a system) and the DLD assay simultaneously sort immune cells (WBC) from whole blood and profile the biophysical properties of size, deformation, distribution and cell count which correlates to the immune states. The deterministic nature of particle interactions within DLD devices result in predictable and high-resolution (~10 nm) sorting. As will be shown in the following examples, unconventional L and inverse-L ($L^{-1}$) DLD pillar structures interact and sort WBCs differently resulting in unique biophysical signatures. DLD precision sorting was translated into an assay to quantify and profile the immune states of WBCs reflecting severity of immune response. The hydrodynamic interactions of deformable immune cells enable simultaneous sorting and immune response profiling in whole blood.

In the following examples, the biophysical DLD assay was performed directly on whole blood samples from healthy donors and patients recruited from the ED. Interestingly, the DLD assay reveals divergent biophysical signatures of immune cells from patients with infection versus immune cells triggered in vitro with known activators such as lipopolysaccharides (LPS) and phorbol 12-myristate 13-acetate (PMA). These findings suggest in vitro immune cell activation do not mimic physiological immune cell response and emphasize the significance of this work on profiling immune cells in its native physiological state whole blood with minimal perturbation.

In the following examples, the diagnostic modality was evaluated by recruiting 8 healthy donors, 36 donors with non-infection symptoms such as cardiac conditions and 41 donors presenting to the ED with 2 or more components of the systemic inflammatory response syndrome (SIRS). The DLD assay on a single drop of blood reveals significant immune biophysical response signatures which resulted in distinction between infection and non-infection group with a detection sensitivity of 0.91 and specificity of 0.92.

In the following examples, with a whole blood sample throughput of up to 10,000 cells/s using video captured frame rates of 15 to 150 frames per second (fps), it is shown that the biophysical diagnostic modality can be easily achieved using low-cost and compact machine vision cameras or smart phone optical sensors making it attractive for deployable point-of-care systems for rapid patient triage of immune dysregulation in ED. This could potentially change disease diagnosis, treatment, and risk management in the settings of primary care and hospitals.

The preliminary clinical study of the 85 donors in emergency department with a spectrum of immune response states from healthy to severe inflammatory response shows correlation with biophysical markers of immune cell size, deformability, distribution, and cell counts. The speed of patient stratification demonstrated here has promising impact in deployable point-of-care systems for acute infections triage, risk management and resource allocation at emergency departments, where clinical manifestation of infections severity may not be clinically evident as compared to inpatients in the wards or intensive care units.

WBC Biophysical Measurements in DLD Device

FIG. 1A shows DLD devices (or systems) 100 used for immune cell profiling assay consist of a polydimethylsiloxane (PDMS) device with three open reservoirs with respective inlet ports 102A, 102B and 102C, and a single outlet tubing coupled to an outlet port 104 and attached to a syringe pump. The open reservoirs 102A, 102B and 102C facilitate easy sample loading, sample resuspension to prevent settling of cells and washing the reservoir to reuse the device. The required loaded volume per run is 10 μL and the reservoir can hold up to 25 μL of blood. As the fluid is withdrawn, the sample flows through a region comprising 21 DLD device segments sandwiched between two 1× phosphate-buffered saline (PBS) buffer streams (see Table 2). Each segment comprises an array of pillars and has a specific DLD critical cut-off size ($D_c$) determined by the empirical Equation (1):

$$D_c = 1.4G\tan\theta^{0.48} \quad (1)$$

where G is the regular spacing between pillars and θ is the gradient of the pillar array. This design is known as a chirped DLD array where each downstream segment has an increasing pillar row-shift gradient corresponding to an increasing $D_c$ ranging from 6.0 to 16.0 μm in steps of 0.5 μm (see Methods). Immune cells flowing through the device 100 are deflected laterally only within DLD segments where cell sizes are larger than $D_c$; the cells therefore exit the device 100 at defined lateral positions depicted in the output region shown in FIG. 1A. The output of the sorting forms a spectrum in its size distribution (i.e., a biophysical parameter based on a distribution profile of the cells sorted by the array of pillars). The apparent cell size ($D_{app}$) is the size that is exhibited in a DLD microfluidic device given the design parameters $D_c$ from Equation (1) and the observed outlet distribution.

TABLE 2

Figure 2A:
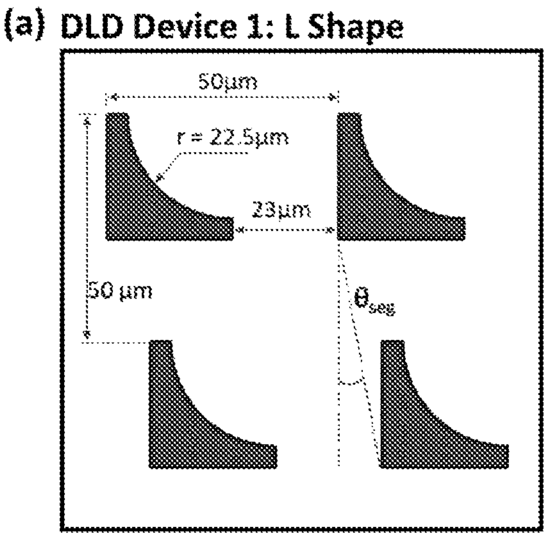
FIGS. 2A and 2B are schematic drawings showing the specifications for DLD devices 1 and 2, respectively, in accordance with various embodiments disclosed herein. $\theta_{seg}$ changes depending on the 21 DLD segments.
Figure 2B:
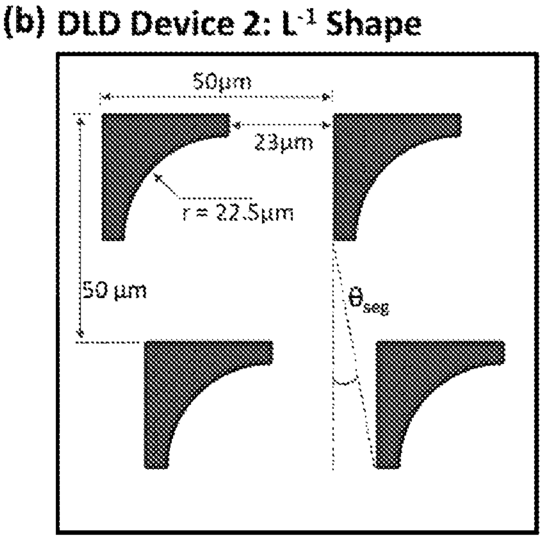

DLD segments parameters for $D_c$ calculation based the DLD pillar dimensions shown in FIGs. 2A and 2B.

| Segment | Dc (μm) | N | Gradient (Deg) | Segment Length (μm) |
|---|---|---|---|---|
| 1 | 6.0 | 33.13 | 1.73 | 1656 |
| 2 | 6.5 | 28.04 | 2.04 | 1402 |
| 3 | 7.0 | 24.03 | 2.38 | 1201 |
| 4 | 7.5 | 20.81 | 2.75 | 1041 |
| 5 | 8.0 | 18.19 | 3.15 | 910 |
| 6 | 8.5 | 16.04 | 3.57 | 802 |
| 7 | 9.0 | 14.24 | 4.02 | 712 |
| 8 | 9.5 | 12.72 | 4.50 | 636 |
| 9 | 10.0 | 11.43 | 5.00 | 571 |
| 10 | 10.5 | 10.32 | 5.53 | 516 |
| 11 | 11.0 | 9.37 | 6.09 | 469 |
| 12 | 11.5 | 8.54 | 6.68 | 427 |
| 13 | 12.0 | 7.82 | 7.29 | 391 |
| 14 | 12.5 | 7.18 | 7.93 | 359 |
| 15 | 13.0 | 6.62 | 8.59 | 331 |
| 16 | 13.5 | 6.12 | 9.29 | 306 |
| 17 | 14.0 | 5.67 | 10.00 | 284 |
| 18 | 14.5 | 5.27 | 10.74 | 264 |
| 19 | 15.0 | 4.91 | 11.51 | 246 |
| 20 | 15.5 | 4.59 | 12.30 | 229 |
| 21 | 16.0 | 4.29 | 13.11 | 215 |

The DLD assay has a minimum measurable $D_{app}$ of 6.0 μm, and RBCs having an apparent size of less than 3.0 μm would not be deflected laterally in the DLD device. As such, the input and output lateral position of RBCs remains the same, albeit with a larger spread at the outlet region. This spread is due to diffusive effects and the stochastic nature of RBC interaction within the DLD (compare images of input region and output region shown in FIG. 1A). The distribution of WBCs across the outlet can be counted and analysed for its apparent mean size and standard deviation (S.D.).

Figure 1B:
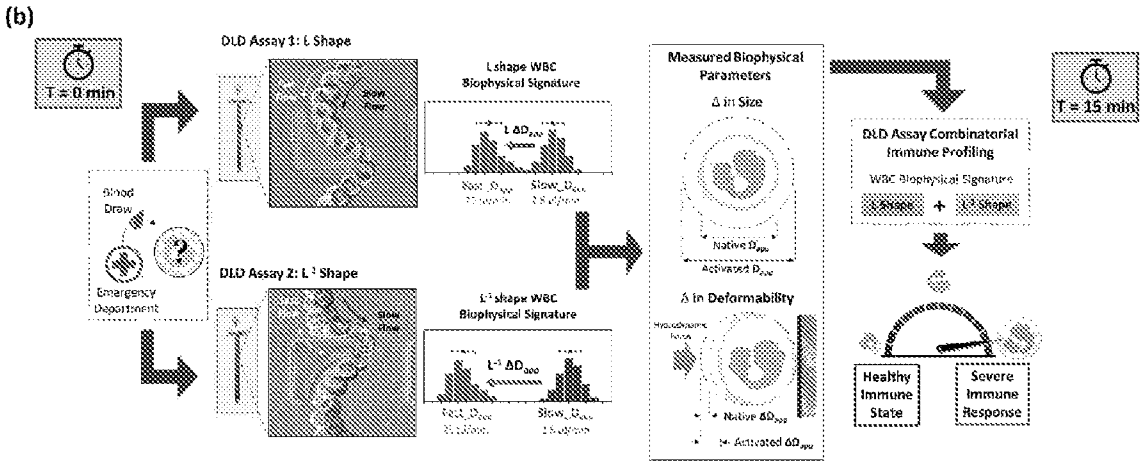

Two DLD pillar structures were investigated in this example, namely L and $L^{-1}$ (see FIG. 1B and FIGS. 2A and 2B). Previous studies have shown contrasting sorting effects of these two pillars on the highly deformable and biconcave disc-shaped RBC. Despite the preliminary evidence of size and shape deformability sorting of RBCs, information on DLD pillar shape effects on generally spherical and deformable WBCs is lacking. In this example, the unique WBC sorting signatures (or biophysical signatures) of these different DLD pillar structures are utilized as an assay to profile the activation state of WBCs (see FIG. 1B). By using different flow velocities, each DLD assay elicits a unique biophysical interaction with deformable WBCs. These biophysical traits and parameters are aggregated and used to classify the WBC state as activated or non-activated.

Effect of Flow Rates on WBC Size and Deformation

Figures 3A, 3B:
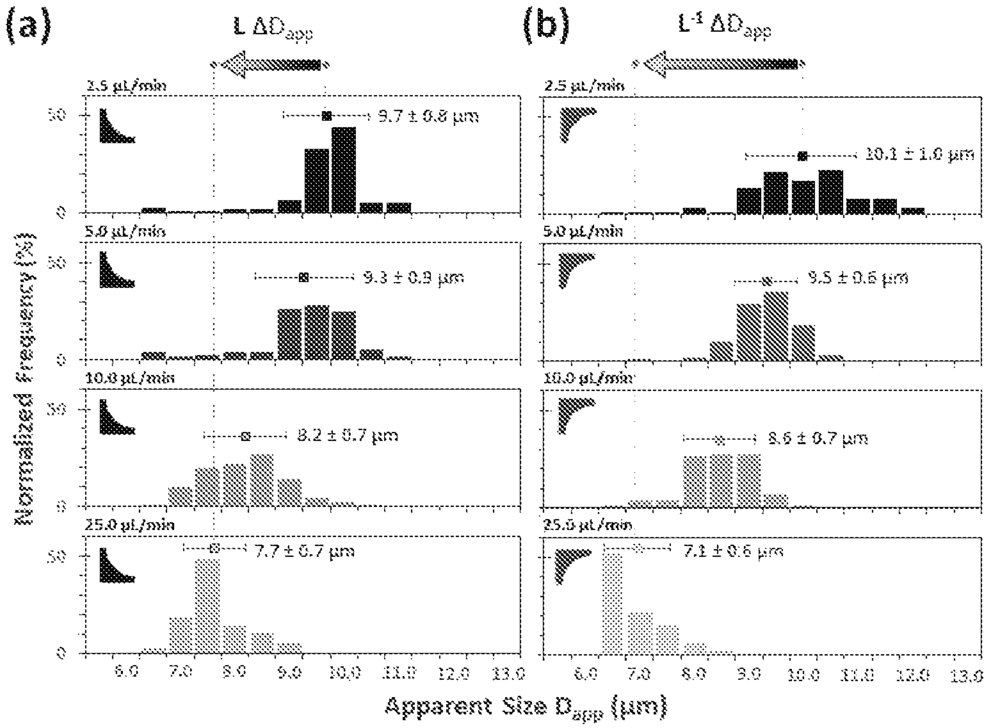
FIGS. 3A, 3B and 3C are graphs showing size and deformability measurements of WBCs in L and $L^{-1}$. DLD devices in accordance with various embodiments disclosed herein. The frequency distribution plot for the measure $D_{app}$ of WBCs at various flow velocities in different devices are shown in FIG. 3A for L and in FIG. 3B for $L^{-1}$. The $L\Delta D_{app}$ and $L^{-1}$ $\Delta D_{app}$ were measured at 2.0 and 3.0 μm, respectively. n>100 were used for each distribution and the error bar denotes the sample standard deviation.

WBCs are deformable particles and their morphology changes with application of external forces. As shown in FIGS. 3A and 3B, the $D_{app}$ of WBCs decreases as fluid flow rate increases. For the L-shaped DLD assay, the WBC output spectrum shows a mean $D_{app}$ of 9.7 μm, 9.3 μm, 8.2 μm and 7.7 μm for flow rates of 2.5, 5.0, 10.0 and 25.0 μL/min, respectively (see FIG. 3A). In the $L^{-1}$ DLD device, WBCs have mean $D_{app}$ from 10.1 μm, 9.5 μm, 8.6 μm to 7.1 μm (see FIG. 3B). The reduction in mean $D_{app}$ at 2.5 μL/min to 25

μL/min is denoted by $\Delta D_{app}$, which corresponds to L $\Delta D_{app}$=2.0 μm and $L^{-1}$ $\Delta D_{app}$=3.0 μm. This measures up to at least 15% reduction in mean $D_{app}$ as the flow rate increases.

Figure 3C:
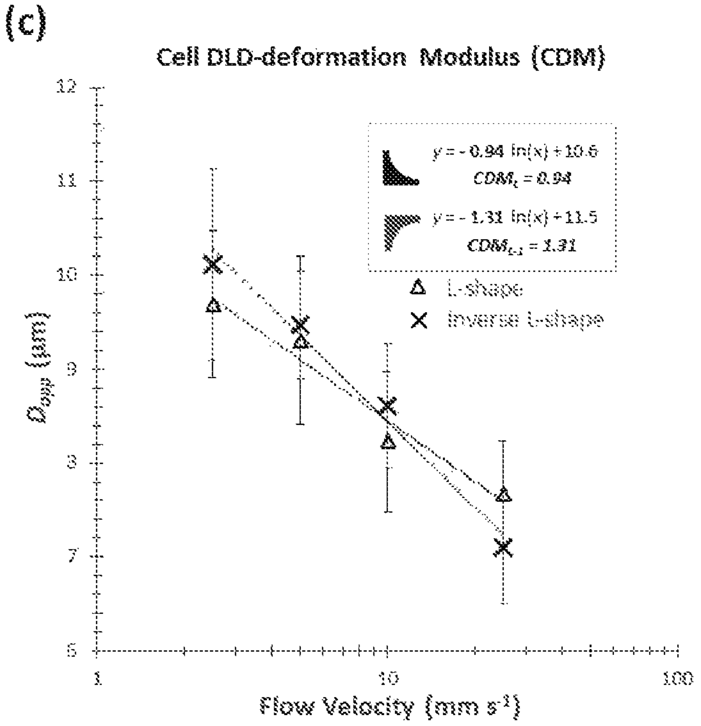

The difference between two DLD assays using the same sample can be interpreted clearer in the graph plot shown in FIG. 3C where $D_{app}$ is plotted against flow velocity. The trend is linear in the logarithmic scale, resulting in a log-linear equation measuring the change of $D_{app}$ with respect to fluid flow velocity. In FIG. 3C, the modulus of the gradient is defined as DLD cell-deformability modulus (CDM). The CDM parameter quantifies the change in WBC apparent size over varying flow velocities from the measurement at 2.5 L/min. The CDM parameter for L and $L^{-1}$ are denoted as $CDM_L$ and CDM $L^{-1}$, respectively. As the L DLD assay showed a smaller L $\Delta D_{app}$ (see FIG. 3A), the $CDM_L$ in FIG. 3C is correspondingly smaller at 0.94 as compared to $CDM_L^{-1}$ at 1.31.

As shown in FIGS. 3A to 3C, DLD profiling assays using L and $L^{-1}$ pillar shapes lead to different sorting signatures for deformable cells. On the contrary, the same DLD assay performed on rigid beads shows no significant change in $D_{app}$ at different flow rates for L and $L^{-1}$ DLD tests (see Supplementary Discussion 1 below and FIGS. 4A and 4B). This example strongly demonstrates that unequal cell deformation results in different flow outcomes in L and $L^{-1}$ DLD pillar structures.

Supplementary Discussion 1: Device Characterisation and Flow Performance

Figure 4A:
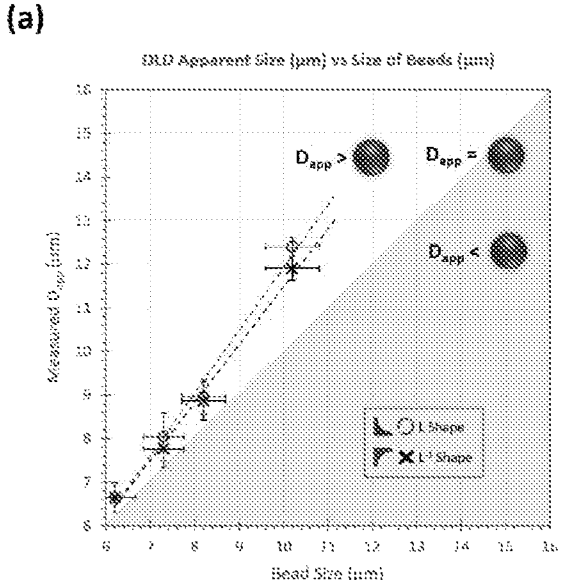
FIGS. 4A and 4B are graphs illustrating DLD device characterisation using bead standards at different flow velocities in accordance with various embodiments disclosed herein.

Beads of 6.2, 7.2, 8.3 and 10.2 μm sizes were used for characterisation of both L and $L^{-1}$ DLD devices. FIG. 4A shows the characterized plots of size of beads versus the measured $D_{app}$ of various beads in L and $L^{-1}$ DLD devices. The flow rate used is 2.5 μL/min. The boundary demarcating the top half and bottom half triangular region is the theoretical boundary for which the measured $D_{app}$ is equivalent to designed specifications of $D_c$ based on Equation (1). Points in the top half triangular region above the central line denote increased DLD sorting performance where a change in size of beads result in a larger change in measured $D_{app}$. Both L and $L^{-1}$ characterized sorting plots lies within the top half triangular region, because the beads are not deformable at all.

This enhancement in $D_{app}$ is not unexpected. It is noted that L and $L^{-1}$ structures constitute a class of DLD structures known to induce asymmetric fluid flow profiles which increases the sorting effectiveness relative to symmetric flow profiles of circle pillar structures. This implies that for the same DLD gap and angle, a smaller specific $D_c$ can be achieved. However, what is assumed here is the skew and linear relationship based on the dotted line plot in FIG. 4A. Since this is a chirped DLD design, small incremental pillar shape enhancement in each DLD segments adds up, which results in the corresponding skew.

Two interesting observations are highlighted here. Firstly, the linear plot skew represents a 1.5× amplification of bead size measurement for L and $L^{-1}$ DLD pillars (see FIG. 4A). A 1.0 μm change in bead size will result in a 1.5 μm difference in measurement. This factor is vital as measurements in deformability is simply the change in size over various flow velocities and thus a 1.5× amplification measurement suggest increased sensitivity over the designed specifications based on $D_c$=$D_{app}$=Size. Secondly, the S.D. of the measure $D_{app}$ is the same or smaller than the S.D. provided by the manufacturer. This suggests DLD measurements of $D_{app}$ can accurately quantify the size and S.D. of the beads.

Figure 4B:
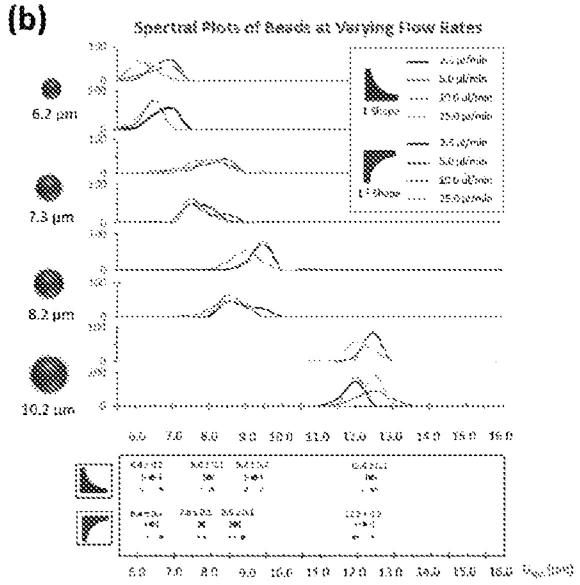

The effects of fluid flow velocities on sorting of rigid spherical beads were evaluated in FIG. 4B and the raw histogram with mean and S.D. of the various measurements are shown. Fluid velocities varied from 2.5 μL/min to 25.0 μL/min for all the beads in the two DLD pillars. Altering flow rates of beads seem to vary within 0.5 μm. Thus, the impact of increasing flow velocities minimally changes $D_{app}$ suggesting that rigid beads do not change its $D_{app}$ size in these flow rates with minimal deformation. Since Reynolds number in this setting is Re<1 (~0.05-0.5), laminar flow is also expected resulting in a deterministic and predictable behaviour of rigid beads.

Visualizing WBC Flow Signatures in DLD Assays

Figure 5A:
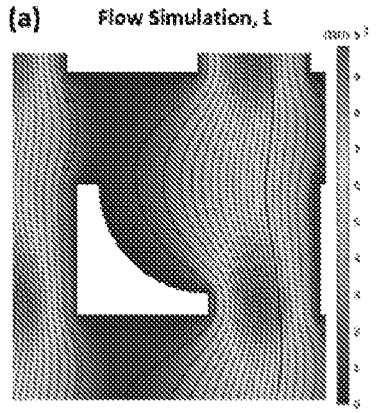
FIGS. 5A, 5B, 5C and 5D are images illustrating WBC paths over $L^{-1}$ and L pillars in accordance with various embodiments disclosed herein.
Figure 5C:
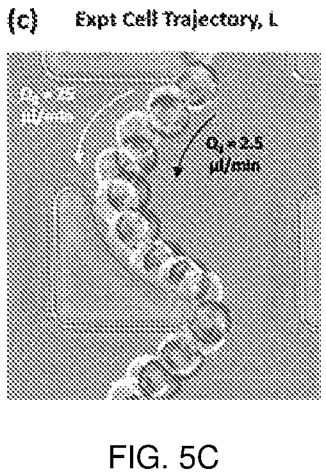
Figure 5B:
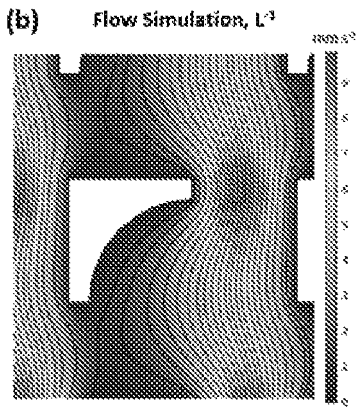
Figure 5D:
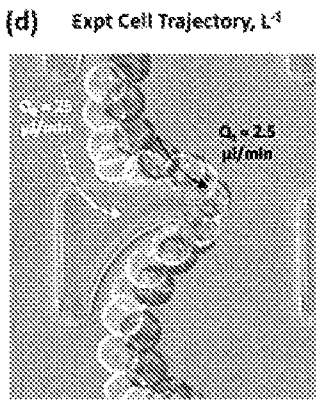

In the exemplary DLD assays, measured $D_{app}$ varies depending on the pillar structure. This is primarily due to WBC deformability, resulting in differences in their periodic flow trajectories as they navigate between the two consecutive DLD pillar micro-structures. The simulated hydrodynamic streamlines visualize the fluid motion with respect to the cell (see FIGS. 5A and 5B), clearly showing fluid flow differences. This principle becomes clearer when the experimental cell trajectory is tracked within a small DLD pillar unit for L and $L^{-1}$ structure (see FIGS. 5C and 5D). Each pillar structure interacts with the deformable cell in complex ways, and it is evident that the paths taken by cells at slow ($Q_1$=2.5 μL/min) and fast ($Q_2$=25.0 μL/min) flow rates differ between L and $L^{-1}$ DLD pillars. DLD relies on repetitive interactions between stationary pillars and moving cells, any small difference in cell path over a single pillar accumulates and the sum-total of all pillar interactions translates to a larger sensible change in $D_{app}$ measured at the output of the DLD devices.

Figure 6:
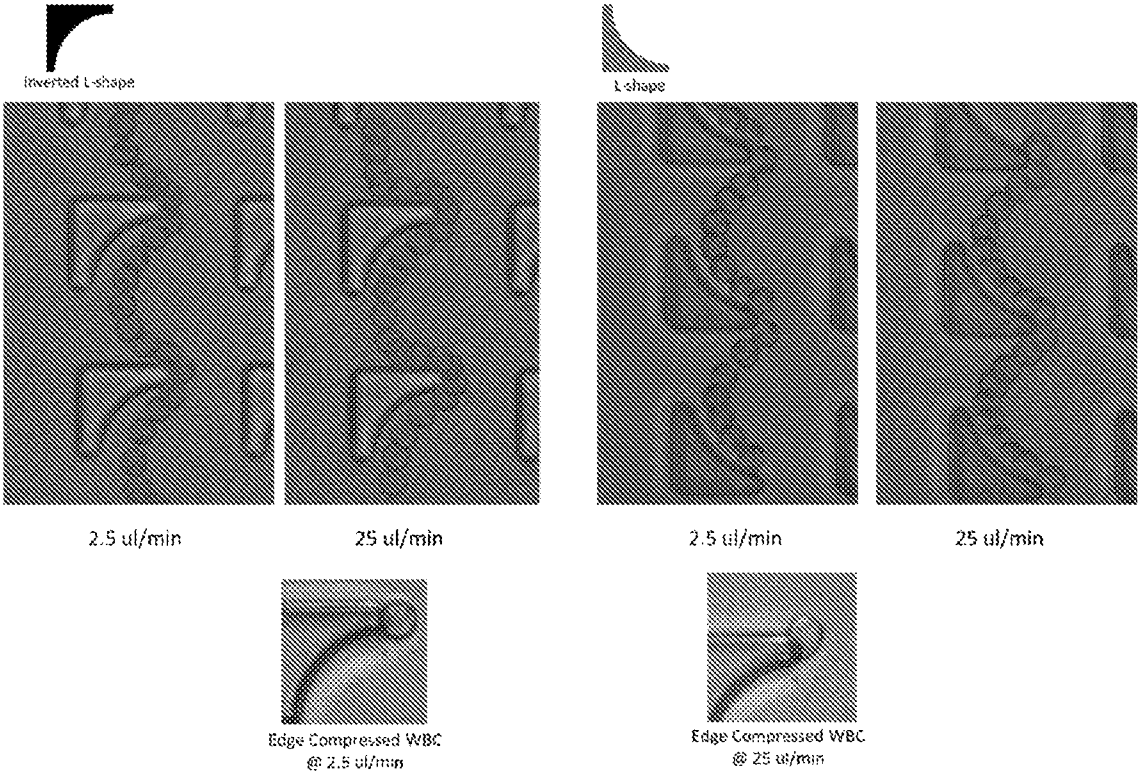
FIG. 6 is an image showing WBC overlay images for L and $L^{-1}$ DLD structures in accordance with various embodiments disclosed herein.

This cell deformation at increasing fluid flow rates is the leading cause of the decreasing $D_{app}$. Detailed analyses of WBC velocity for each pillar structure provide a deeper understanding of cell-DLD interactions (see FIG. 6).

WBC Biophysical Signatures in DLD Assay

Figure 7A:
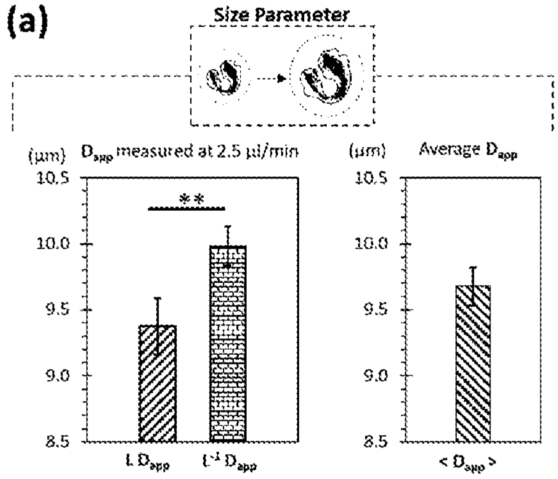
Figure 7B:
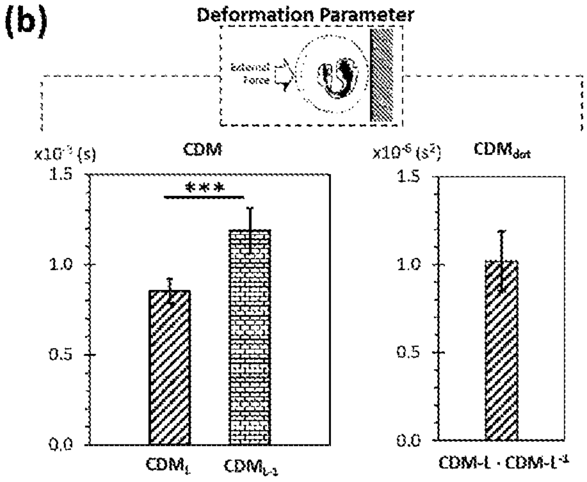

Unlike rigid beads, the WBC sorting differences for L and $L^{-1}$ DLD assays give rise to unique biophysical signatures. It was hypothesized that the unique biophysical signatures can be utilized to profile WBC samples. To investigate the variations of the biophysical signature, the DLD assays were performed at the same flow parameters on 5 healthy donor samples, and the results are shown in FIGS. 7A and 7B. $L^{-1}$ $D_{app}$ measures consistently higher at 9.98±0.15 μm than L $D_{app}$ at 9.37±0.21 μm at 2.5 μL/min with a p-value of 0.004. The CDM measurements for the 5 healthy samples also showed consistent differences with $CDM_L^{-1}$ having a larger value of 1.19±0.13 compared to $CDM_L$ of 0.85±0.07 with a p-value of <0.001. Both tests were performed using a paired 2-tailed t-test.

Figure 8:
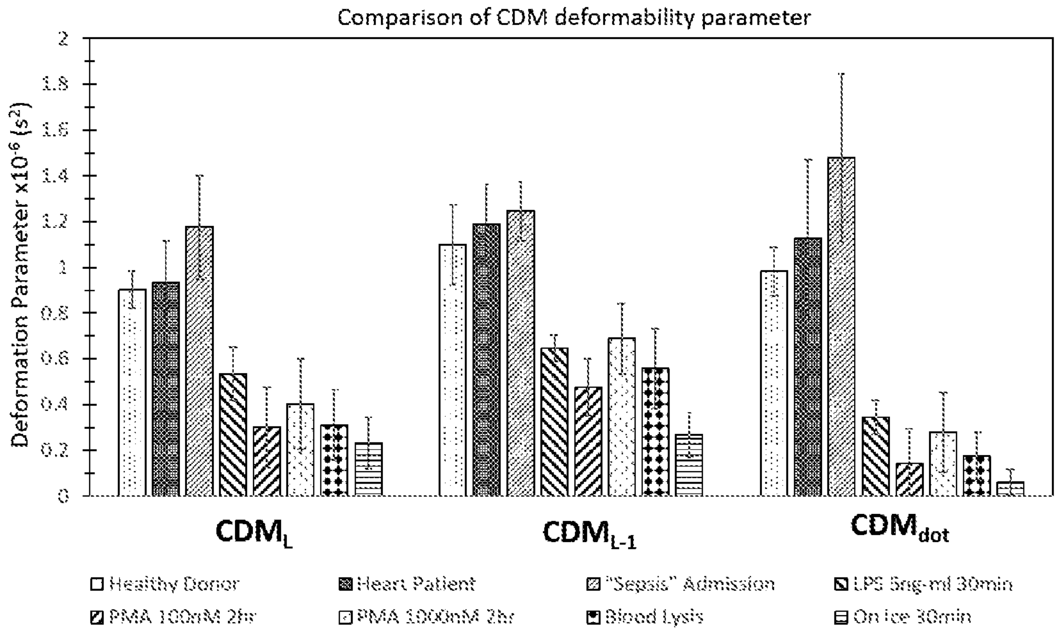
FIG. 8 is a graph showing a comparison of various CDM measurements of $CDM_L$, $CDM_L{}^{-1}$ and $CDM_{dot}$ in accordance with various embodiments disclosed herein.

To evaluate the biophysical combinatorial immune profiling potential of DLD assay, a single biophysical size and deformability parameter is determined. For size parameters, the average $D_{app}$ for L and $L^{-1}$ assays was quantified at 2.5 μL/min, while a single cell deformability parameter ($CDM_{dot}$) was emphasized by taking the product of the $CDM_L$ and $CDM_L^{-1}$ measurements. Performing a product amplifies the deformability differences compared to $CDM_L$ and $CDM_L^{-1}$ measurements individually (see FIG. 8). By combining the measurements of two DLD devices, a unique leukocyte biophysical fingerprint as a profiling tool to measure different states of WBC from whole blood in real-time was envisioned (see FIG. 1B).

DLD Assay Combinatorial Immune Profiling

Using the two parameters of $D_{app}$ and $CDM_{dot}$, various conditions of immune cells from whole blood were profiled.

Figure 7C:
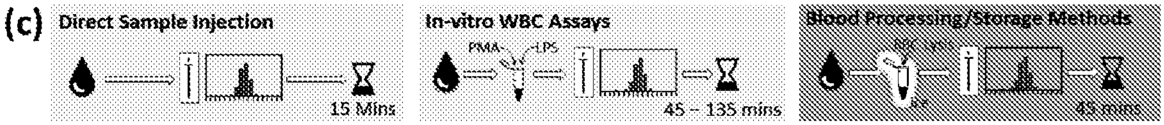
FIG. 7C shows three groups of measurements performed, namely biophysical profiling of WBCs from direct sample injection, in vitro WBC assays and common blood processing/storage methods. Direct sample injections include a healthy donor control sample, emergency department (ED) admission control (i.e. patients with no clear signs of infection) and ED admission with infection and two or more systemic inflammatory response syndrome (SIRS) criteria. The mean size measurement, $D_{app}$, across all samples are depicted in FIG. 7D while the deformability parameter $CDM_{dot}$ is shown in FIG. 7E. The horizontal dotted line denotes the mean value of healthy donor in FIGS. 7D and 7E with standard deviation shown in the shaded region. n=5 samples were used for all plots with standard deviation represented by the error bar.

Three groups of immune cell conditions were measured, namely direct sample sparing measurements, in vitro WBC assays and impact of blood processing methods on immune cell biophysical properties (FIG. 7C).

Direct sample measurements enable the study of WBC biophysical profiles in different health states of an individual for healthy donors, patients admitted to the ED without signs of infection (ED Control), and patients with clear signs of infection and fulfilling at least two SIRS criteria (ED≥2 SIRS) (See Table 3). The second group are tests performed on blood, which have undergone external or in vitro test conditions to activate the WBCs. These include 5 ng/ml lipopolysaccharide (LPS), which mimics the bacteria coat that would trigger inflammation and phorbol 12-myristate 13-acetate (PMA) at 100 and 1000 nM, a known activator of WBCs. Lastly, standard blood processing methods were tested, specifically the commonly used RBC lysis protocol to retrieve immune cells and whole blood stored on ice. All tests were initiated within 1 hour of blood draw to accommodate the transport time of blood from hospital to laboratory and concluded within 15 minutes of biophysical profiling.

TABLE 3

Initial Patient Recruitment for Biophysical Testing

| | Infection Class | | | |
|---|---|---|---|---|
| | 0 | | 1 | |
| | Sub-Class | | | |
| | −1 | 0 | 1 | |
| | Characteristic | | | |
| | Healthy | Control | ≥2 SIRS | Total |
| Number of patients | 5 | 5 | 5 | 10 |
| Number of blood samples | 5 | 5 | 5 | 10 |
| Age - mean (years) | 34 | 45 | 52.2 | 48.6 |
| Male sex - no. | 3 | 3 | 2 | 5 |
| Septic - no. | N/A | 0 | 1 | 1 |
| Septic Shock - no. | N/A | 0 | 0 | 0 |
| Acute renal failure - no. | N/A | 0 | 1 | 1 |
| Death - no. | N/A | 0 | 0 | 0 |
| ≥2 SIRS - no. | N/A | 0 | 5 | 5 |
| Site of infection at the time of blood sampling | | | | |
| A. Pneumonia | N/A | N/A | 1 | 1 |
| B. Urinary tract infection | N/A | N/A | 1 | 1 |
| C. Intraabdominal infection | N/A | N/A | 2 | 2 |
| D. Skin or soft-tissue infection | N/A | N/A | 0 | 0 |
| E. Intrathoracic infection | N/A | N/A | 1 | 1 |

Figure 7D:
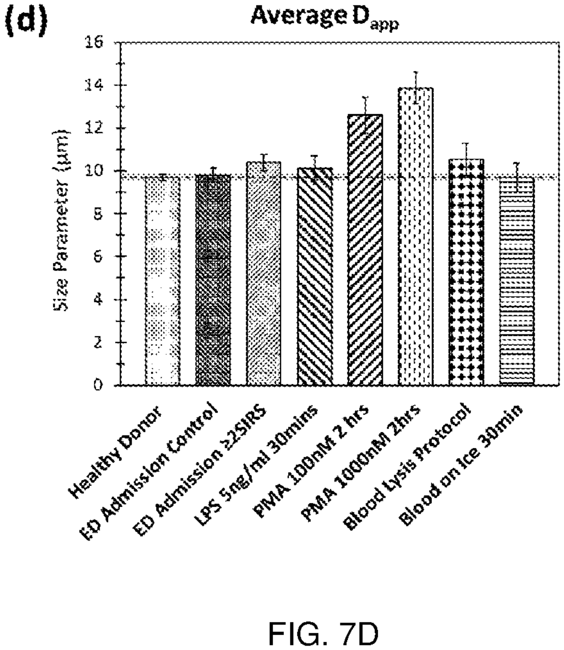

The dotted line in FIG. 7D denotes the baseline mean measurement of $D_{app}$ for 5 healthy samples at 9.7±0.1 μm. In comparison, for all tested conditions, WBC $D_{app}$ only seems to increase and not decrease with varying magnitude for different conditions. For the closest in vivo model of direct sample injection, ED≥2 SIRS showed a larger size of 10.4±0.4 μm compared to ED control (9.8±0.3 μm). In contrast, WBC biochemical activation with incubation of PMA at 100 nM and 1000 nM for 2 hours showed a much larger increase of $D_{app}$ at 12.6±0.8 μm and 13.9±0.7 μm, respectively. This is a drastic 30% to 43% increase in WBC $D_{app}$. Interestingly, the RBC lysis process also showed an increase in WBC $D_{app}$, which suggests potential activation and biophysical changes in the WBCs. Blood processing protocol to store blood samples on ice did not change the WBC $D_{app}$.

Figure 7E:
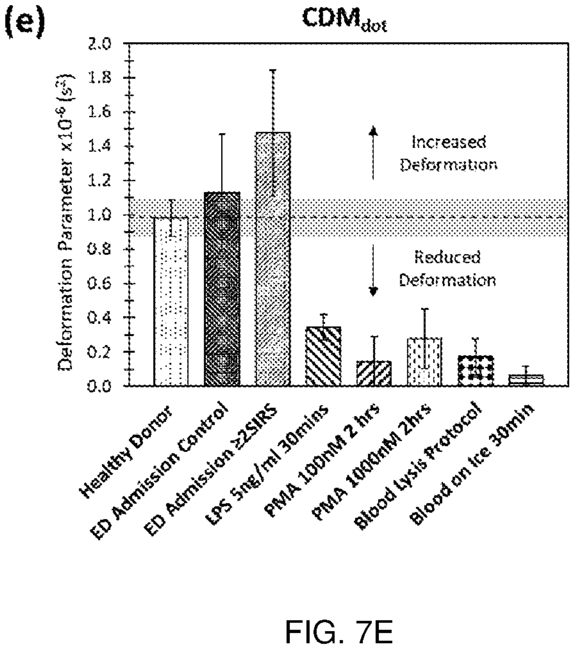

$CDM_{dot}$ measurements on the other hand describe a different parameter of the WBC. A larger $CDM_{dot}$ relative to the healthy donor measurements in FIG. 7E indicates an increase in deformability while a reduced $CDM_{dot}$ shows a decrease in deformability. These CDM differences are benchmarked against the control measurements of healthy samples with a $CDM_{dot}$ of 0.98. A surprising result emerged from the deformability parameter measurement as all in vitro assays and sample pre-processing steps resulted in reduced deformation of WBC measured. This means that the size compression of WBC is reduced compared to the healthy baseline. On the contrary, direct sample injection tests showed that the WBC deformability increased instead when infection is present in the patient. The greatest change in deformability was demonstrated in samples of blood on ice where the $CDM_{dot}$ is greatly reduced to less than 0.10 while its size measurements did not change. The cold temperatures experienced by cells could potentially affect mechanical properties of cells due to stiffening of cytoskeletal networks and lipid bilayer.

WBCs from patients who have infections show an increase in deformation relative to WBCs of healthy donors. The divergence of $CDM_{dot}$ measurements was unexpected. This suggest that in vitro assays mimicking WBC activation could not replicate the physiological conditions of WBC biophysical parameters despite incubation in whole blood at 37° C., as post-blood draw WBC activation assays illicit a different biophysical response relative to innate blood from infected patients. This evidently shows that activation of WBC is multi-dimensional and complex physiologically. Simple and single triggers of activation are highly unlikely the cause for the observed WBC biophysical characteristics. The data also emphasize the conflicting results of earlier studies showing WBCs of ICU sepsis patients being less deformable while other previous works showed increase in WBC deformability during infection. Previous studies also attempted to mimic sepsis via biochemical trigger cocktails but were unable to do so. This highlights the importance of the various exemplary embodiments disclosed herein in developing tools to probe innate immune states with minimal sample handling and ex vivo delay time.

Biophysical Immune Markers of Severe Inflammation

Figure 9:
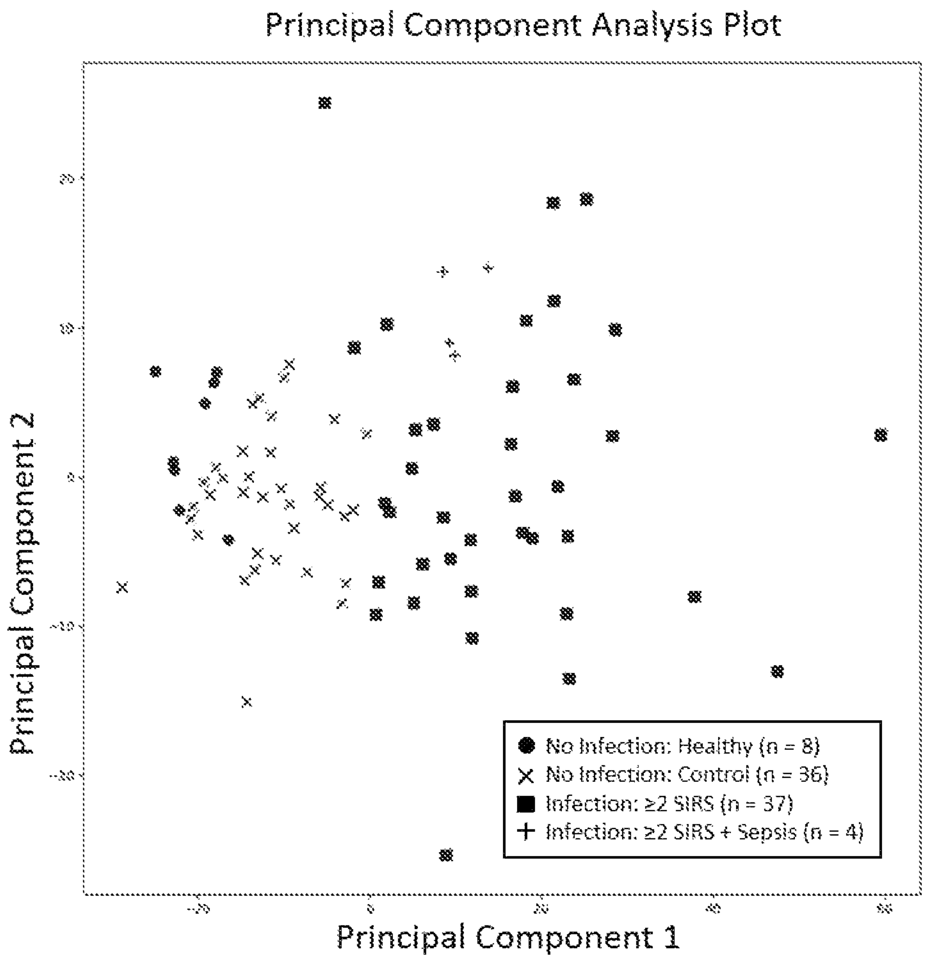
FIG. 9 is a graph showing a 38 biophysical marker Principal Component Analysis (PCA) plot in accordance with various embodiments disclosed herein.

Patient recruitment from the ED of the National University Hospital, Singapore, was conducted with ethics approval from the local institutional review board (National Healthcare Group Singapore, Domain Specific Review Board, DSRB reference number: 2018/00115). Written informed consent was obtained from enrolled participants. Based on the results from FIGS. 7A to 7E, the direct sample injection tests were expanded and 85 donors comprising two broad categories of donors without infection or with infection were recruited. The "no infection" group includes 8 healthy donors (Healthy) and 36 ED admission controls (Controls) while the "infection" group comprised 41 ED admissions with infection plus ≥2 SIRS criteria (see Table 4). Additionally, instead of just size and deformability parameters, cell count and the WBC distribution were evaluated with a range of 38 identified biophysical markers parameters (features) listed from the DLD assay resulting in a clearly distinct PCA plot (See FIG. 9 and Tables 5 and 6).

TABLE 4

Larger Cohort Test Patient Recruitment from ED.

| | Infection Class 0 | | Infection Class 1 | | |
|---|---|---|---|---|---|
| | Sub-Class −1 | Sub-Class 0 | Sub-Class 1 | Sub-Class 2 | |
| Characteristic | Healthy | Control | ≥2 SIRS | ≥2 SIRS + Sepsis | Total |
| Number of patients | 8 | 36 | 37 | 4 | 85 |
| Number of blood samples | 8 | 36 | 37 | 4 | 85 |
| Age - mean (years) | 28.7 | 48.6 | 54.7 | 63 | 50.4 |
| Age - S.D. (years) | 3.7 | 10.5 | 14.0 | 8.3 | 13.9 |
| Male sex - no. | 3 | 17 | 19 | 3 | 42 |
| Sepsis - no. | N/A | 0 | 0 | 4 | 4 |
| Septic Shock - no. | N/A | 0 | 0 | 0 | 0 |
| Acute renal failure - no. | N/A | 0 | 7 | 2 | 9 |
| Death - no. | N/A | 0 | 0 | 0 | 0 |
| ≥2 SIRS - no. | N/A | 0 | 37 | 4 | 41 |

TABLE 4-continued

Larger Cohort Test Patient Recruitment from ED.

| | Infection Class 0 | | Infection Class 1 | | |
|---|---|---|---|---|---|
| | Sub-Class −1 | Sub-Class 0 | Sub-Class 1 | Sub-Class 2 | |
| Characteristic | Healthy | Control | ≥2 SIRS | ≥2 SIRS + Sepsis | Total |
| Site of infection at the time of blood sampling | | | | | |
| A. Pneumonia | N/A | N/A | 8 | 0 | 8 |
| B. Urinary tract infection | N/A | N/A | 5 | 1 | 6 |
| C. Intraabdominal infection | N/A | N/A | 8 | 1 | 9 |
| D. Skin or soft-tissue infection | N/A | N/A | 12 | 0 | 12 |
| E. Intrathoracic infection | N/A | N/A | 3 | 2 | 5 |

TABLE 5

Showing the statistical comparison of 38 features with cross tested paired 2-tailed t-test statistic. Bold numbers show statistical significance.
Feature Statistic

| No. | Feature Name | Feature Description | p-value Class −1 vs 0 | p-value Class 0 vs (1 + 2) | p-value Class −1 vs (1 + 2) |
|---|---|---|---|---|---|
| 1 | Size 1 | $L_{-1}D_{app}$ @ 2.5 μl/min | 0.0997 | **<0.00001** | **0.00001** |
| 2 | Size 2 | $L_{-1}D_{app}$ @ 25.0 μl/min | 0.9566 | 0.06115 | 0.30468 |
| 3 | Size 3 | $L_{-1}D_{app}$ @ 2.5 μl/min | **0.0111** | **<0.00001** | **0.00002** |
| 4 | Size 4 | $L_{-1}D_{app}$ @ 25.0 μl/min | **0.0224** | **0.00998** | **0.00883** |
| 5 | Size 5 | $\langle L_{-1}D_{app} \rangle$ | 0.2288 | **0.00002** | **0.00248** |
| 6 | Size 6 | $\langle L\ D_{app} \rangle$ | **0.0011** | **<0.00001** | **0.00004** |
| 7 | Size 7 | Average $D_{app}$ @ 2.5 μl/min | **0.0124** | **<0.00001** | **0.00001** |
| 8 | Size 8 | Average $D_{app}$ @ 25.0 μl/min | 0.1091 | **0.0140** | **0.0472** |
| 9 | Size 9 | Stdev of $L_{-1}D_{app}$ @ 2.5 μl/min | 0.8531 | 0.1072 | 0.4378 |
| 10 | Size 10 | Stdev of $L_{-1}D_{app}$ @ 25.0 μl/min | 0.4445 | **0.0147** | **0.0450** |
| 11 | Size 11 | Stdev of L $D_{app}$ @ 2.5 μl/min | 0.7798 | 0.2521 | 0.4147 |
| 12 | Size 12 | Stdev of L $D_{app}$ @ 25.0 μl/min | 0.2769 | 0.2758 | 0.0691 |
| 13 | Def 1 | Size 1-Size 3 | 0.3325 | 0.0650 | 0.1256 |
| 14 | Def 2 | Size 2-Size 4 | 0.0659 | 0.3172 | **0.0110** |
| 15 | Def 3 | (Size 1-Size 3)/(Size 2-Size 4) | 0.4121 | 0.4294 | 0.7227 |
| 16 | Def 4 | $CDM_{L-1}$ | 0.2073 | **0.0032** | **0.0072** |
| 17 | Def 5 | $CDM_L$ | 0.9030 | **0.0015** | 0.1069 |
| 18 | Def 6 | $CDM_L$: $CDM_{L-1}$ | 0.3855 | 0.5156 | 0.6098 |
| 19 | Def 7 | $CDM_{dot}$ | 0.5441 | **0.0003** | **0.0234** |
| 20 | Def 8 | Size 6-Size 5 | 0.1202 | 0.0663 | **0.0049** |
| 21 | Dist 1 | Skew: $L_{-1}D_{app}$ @ 2.5 μl/min | 0.0781 | 0.0874 | **0.0023** |
| 22 | Dist 2 | Skew: $L_{-1}D_{app}$ @ 25.0 μl/min | 0.7113 | **0.0201** | 0.3623 |
| 23 | Dist 3 | Skew: L $D_{app}$ @ 2.5 μl/min | 0.7554 | 0.8006 | 0.6018 |
| 24 | Dist 4 | Skew: L $D_{app}$ @ 25.0 μl/min | 0.3362 | 0.1645 | 0.9630 |
| 25 | Dist 5 | Dist 1-Dist 2 | 0.5413 | **0.0025** | **0.0259** |
| 26 | Dist 6 | Dist 3-Dist 4 | 0.2847 | 0.3360 | 0.6660 |
| 27 | Dist 7 | Dist 1-Dist 3 | 0.3668 | 0.3035 | 0.0692 |
| 28 | Dist 8 | Dist 2-Dist 4 | 0.3598 | **0.0003** | 0.2394 |
| 29 | Dist 9 | Kurtosis: $L_{-1}D_{app}$ @ 2.5 μl/min | 0.1565 | 0.4656 | **0.0197** |
| 30 | Dist 10 | Kurtosis: $L_{-1}D_{app}$ @ 25.0 μl/min | 0.6935 | **0.0338** | 0.4194 |
| 31 | Dist 11 | Kurtosis: L $D_{app}$ @ 2.5 μl/min | 0.8214 | 0.4844 | 0.8445 |
| 32 | Dist 12 | Kurtosis: L $D_{app}$ @ 25.0 μl/min | 0.2152 | 0.1328 | 0.8593 |
| 33 | Dist 13 | Dist 1 * Dist 9 | 0.8708 | 0.6188 | 0.8843 |
| 34 | Dist 14 | Dist 9 * Dist 11 | 0.3060 | 0.8689 | 0.4149 |
| 35 | Count 1 | Cell Count: $L_{-1}D_{app}$ @ 2.5 μl/min | 0.6253 | **<0.00001** | **0.0065** |
| 36 | Count 2 | Cell Count: $L_{-1}D_{app}$ @ 25.0 μl/min | 0.6469 | **0.00022** | **0.0246** |
| 37 | Count 3 | Cell Count: L $D_{app}$ @ 2.5 μl/min | 0.9413 | **0.00002** | **0.0260** |
| 38 | Count 4 | Cell Count: L $D_{app}$ @ 25.0 μl/min | 0.5729 | **0.00003** | **0.0157** |

TABLE 6

Description of the features and identified 38 selected markers for profiling of WBC using the DLD assay.
Feature Statistic

| No | Feature Name | Description | Remarks |
|---|---|---|---|
| 1 | Size 1 | $L_{-1}D_{app}$ @ 2.5 μl/min | WBC size measured using $L^{-1}$ DLD at 2.5 μl/min (Slow) |
| 2 | Size 2 | $L_{-1}D_{app}$ @ 25.0 μl/min | WBC size measured using $L^{-1}$ DLD at 25 μl/min (Fast) |
| 3 | Size 3 | L $D_{app}$ @ 2.5 μl/min | WBC size measured using L DLD at 2.5 μl/min (Slow) |
| 4 | Size 4 | L $D_{app}$ @ 25.0 μl/min | WBC size measured using L DLD at 25 μl/min (Fast) |
| 5 | Size 5 | $<L_{-1}D_{app}>$ | Mean size measure at 2.5 and 25 μl/min for $L^{-1}$ DLD |
| 6 | Size 6 | <L D,, > | Mean size measure at 2.5 and 25 μl/min for L DLD |
| 7 | Size 7 | Average L $D_{app}$ @ 2.5 μl/min | Mean size of WBC at 2.5 μl/min for L and $L^{-1}$ DLD |
| 8 | Size 8 | Average L $D_{app}$ @ 25.0 μl/min | Mean size of WBC at 25 μl/min for L and $L^{-1}$ DLD |
| 9 | Size 9 | Stdev of $L_{-1}D_{app}$ @ 2.5 μl/min | Standard deviation of WBC size for $L^{-1}$ DLD at 2.5 μl/min |
| 10 | Size 10 | Stdev of $L_{-1}D_{app}$ @ 25.0 μl/min | Standard deviation of WBC size for $L^{-1}$ DLD at 25 μl/min |
| 11 | Size 11 | Stdev of L $D_{app}$ @ 2.5 μl/min | Standard deviation of WBC size for L DLD at 2.5 μl/min |
| 12 | Size 12 | Stdev of L $D_{app}$ @ 25.0 μl/min | Standard deviation of WBC size for L DLD at 25 μl/min |
| 13 | Def 1 | Size 1-Size 3 | Comparing size difference between L and $L^{-1}$ |
| 14 | Def 2 | Size 2-Size 4 | Comparing deformed difference between L and $L^{-1}$ |
| 15 | Def 3 | (Size 1-Size 3)/(Size 2-Size 4) | Ratio of L and $L^{-1}$ differences of size vs deformed state |
| 16 | Def 4 | $CDM_{L-1}$ | Deformation modulus of $L^{-1}$ |
| 17 | Def 5 | $CDM_{L}$ | Deformation modulus of L |
| 18 | Def 6 | $CDM_{dot}$ | Product of deformation modulus |
| 19 | Def 7 | $CDM_{L}$: $CDM_{L-1}$ | Ratio of deformation modulus |
| 20 | Def 8 | Size 6-Size 5 | Combined size and deformability difference of L and $L^{-1}$ |
| 21 | Dist 1 | Skew: $L_{-1}D_{app}$ @ 2.5 μl/min | The skew of the histogram for $L^{-1}$ at 2.5 μl/min |
| 22 | Dist 2 | Skew: $L_{-1}D_{app}$ @ 25.0 μl/min | The skew of the histogram for $L^{-1}$ at 25 μl/min |
| 23 | Dist 3 | Skew: L $D_{app}$ @ 2.5 μl/min | The skew of the histogram for L at 2.5 μl/min |
| 24 | Dist 4 | Skew: L $D_{app}$ @ 25.0 μl/min | The skew of the histogram for L at 25 μl/min |
| 25 | Dist 5 | Dist 1-Dist 2 | Skew differences between size and deformed states for $L^{-1}$ |
| 26 | Dist 6 | Dist 3-Dist 4 | Skew differences between size and deformed states for L |
| 27 | Dist 7 | Dist 1-Dist 3 | Skew differences of size histogram of $L^{-1}$ and L |
| 28 | Dist 8 | Dist 2-Dist 4 | Skew differences of deformed state of $L^{-1}$ and L |
| 29 | Dist 9 | Kurtosis: $L_{-1}$ $D_{app}$ @ 2.5 μl/min | The Kurtosis of the histogram for $L^{-1}$ at 2.5 μl/min |
| 30 | Dist 10 | Kurtosis: $L_{-1}$ $D_{app}$ @ 25.0 μl/min | The Kurtosis of the histogram for $L^{-1}$ at 25 μl/min |
| 31 | Dist 11 | Kurtosis: L $D_{app}$ @ 2.5 μl/min | The Kurtosis of the histogram for L at 2.5 μl/min |
| 32 | Dist 12 | Kurtosis: L $D_{app}$ @ 25.0 μl/min | The Kurtosis of the histogram for L at 25 μl/min |
| 33 | Dist 13 | Dist 1 * Dist 9 | Product amplification of skew and Kurtosis for $L^{-1}$ |
| 34 | Dist 14 | Dist 9 * Dist 11 | Kurtosis product of size measured at $L^{-1}$ and L |
| 35 | Count 1 | Cell Count: $L_{-1}D_{app}$ @ 2.5 μl/min | Cell count per frame at $L^{-1}$ flow 2.5 μl/min |
| 36 | Count 2 | Cell Count: $L_{-1}D_{app}$ @ 25.0 μl/min | Cell count per frame at $L^{-1}$ flow 25 μl/min |
| 37 | Count 3 | Cell Count: L $D_{app}$ @ 2.5 μl/min | Cell count per frame at L flow 2.5 μl/min |
| 38 | Count 4 | Cell Count: L $D_{app}$ @ 25.0 μl/min | Cell count per frame at L flow 25 μl/min |

Figure 10A:
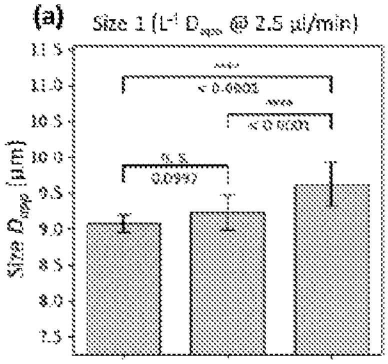
FIGS. 10A, 10B, 10C, 10D, 10E, 10F, 10G and 10H are graphs and an image comparing label-free biophysical immune markers and signatures of various immune status in accordance with various embodiments disclosed herein.
Figure 10E:
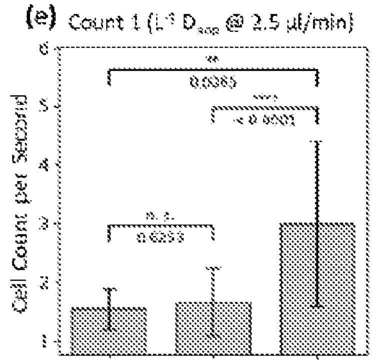
Figure 10B:
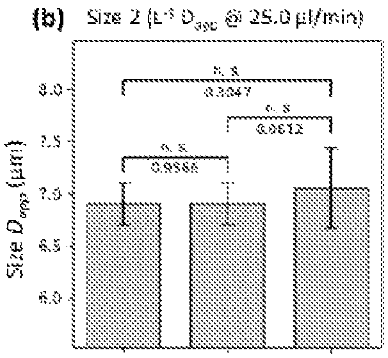
Figure 10F:
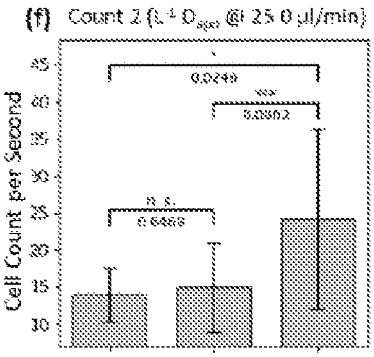
Figure 10C:
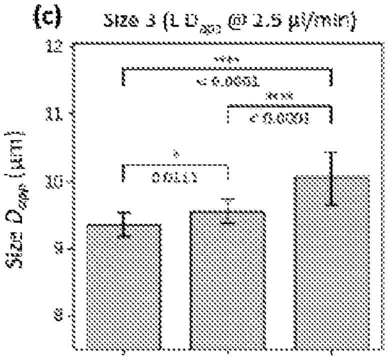
Figure 10G:
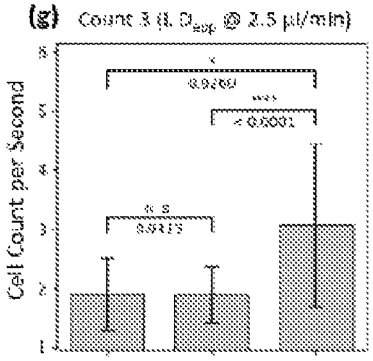
Figure 10D:
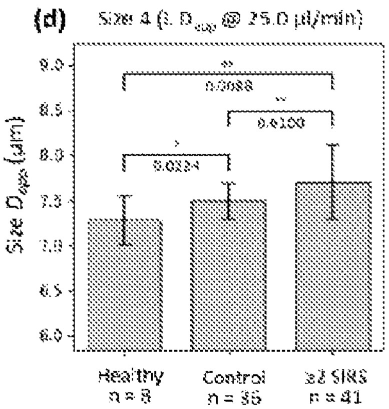
Figure 10H:
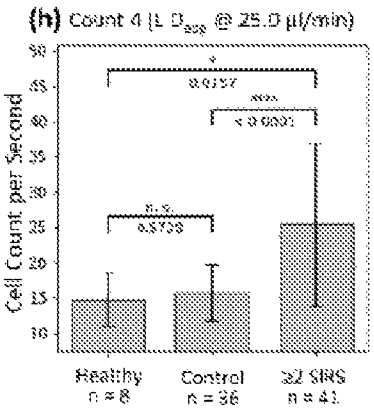
Figure 10I:
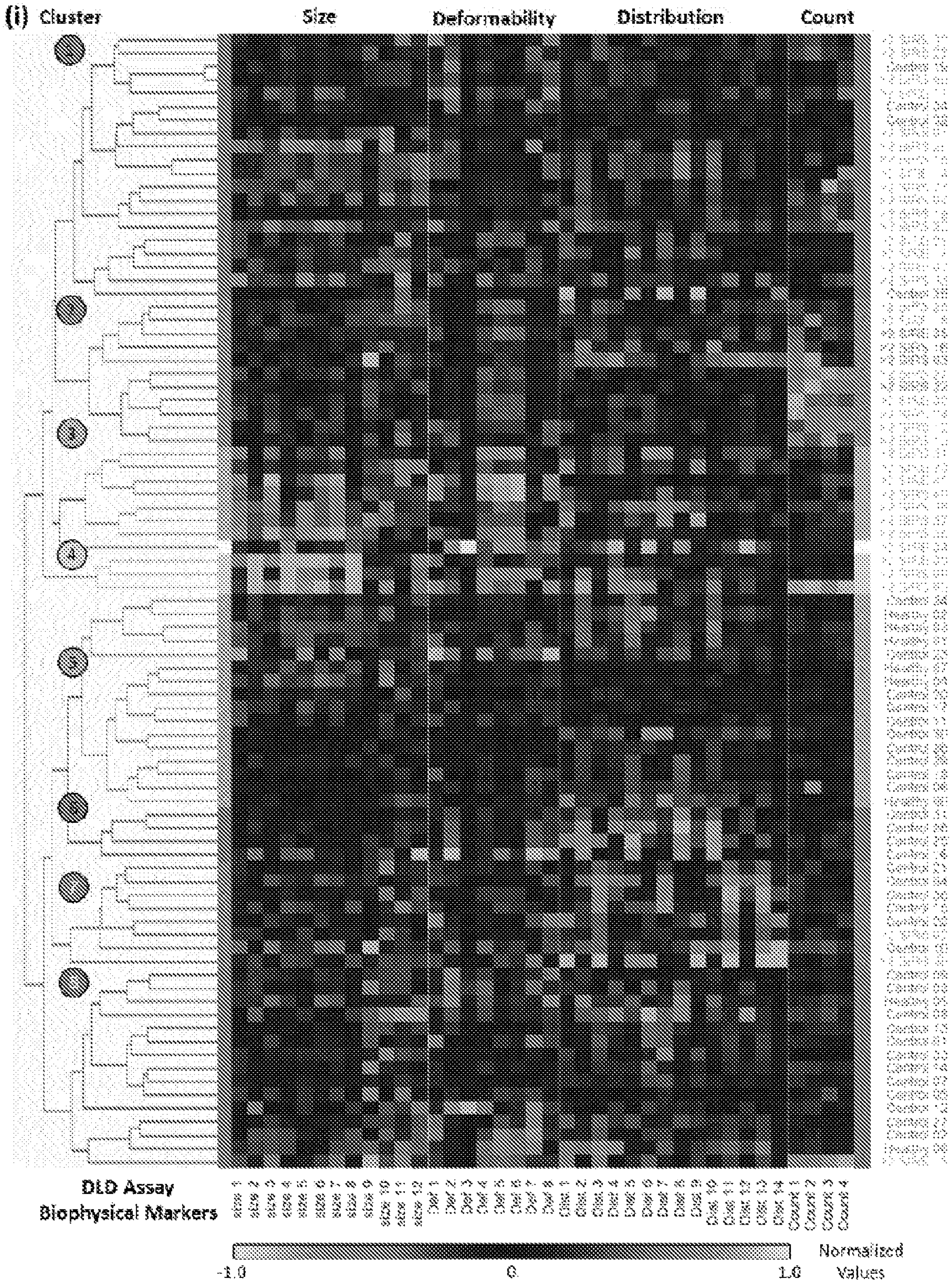
Figure 11:
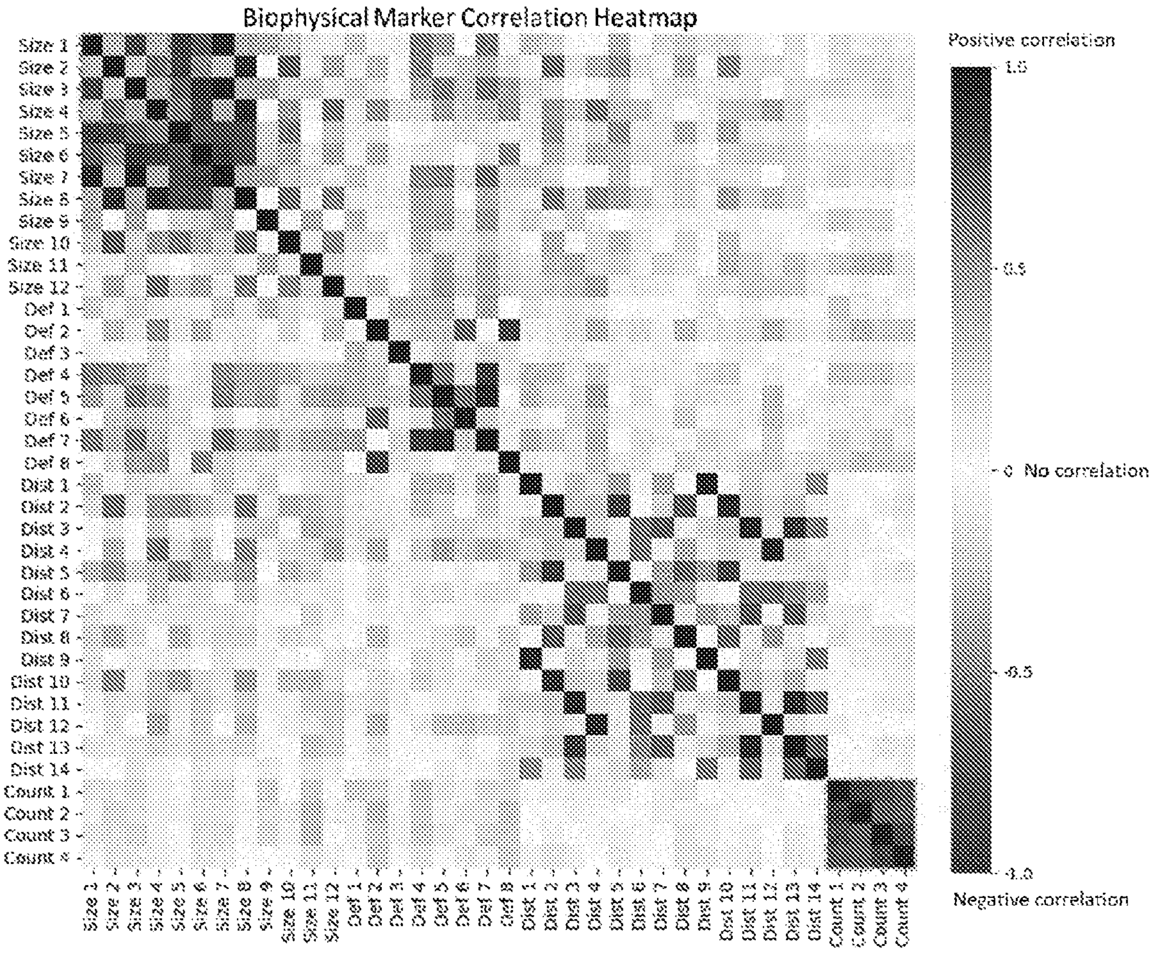
FIG. 11 is an image showing a 38 biomarker features correlation heatmap in accordance with various embodiments disclosed herein.

By plotting the correlation heat map for all the biomarkers, the various correlation clusters of the biomarkers can be distinguished. A 2-tailed t-test was performed for the results shown in FIGS. 10A to 10H and Table 5. Interestingly, it was found that the L DLD assay in FIGS. 10C and 10D could significantly detect differences between all three inter-sample groups (sub-class) of healthy, control and ≥2 SIRS. Cell count data (shown in FIGS. 10E to 10H) only showed distinct differences between control and ≥2 SIRS group. This is not unexpected as cell count is a parameter to assess SIRS criteria. However, it is highly intriguing that cell size (specifically L pillar in Size 3 and Size 4; see FIGS. 10C and 10D) were able to differentiate healthy from ED control group. This suggests that despite no clear signs of infection, the immune size is modulated based on medical conditions that the patients were admitted for. The mean cell size difference between the three groups range from 9 to 10 μm which validates the resolution of DLD assay to probe cells within this narrow $D_{app}$ band. The corresponding statistical analysis for the deformability and distribution markers also showed significant distinction between no-infection and infection group (see Table 5). The correlation heatmap shows that these markers are independently significant as they are not strongly correlated and can be used for immune profiling (see FIG. 11).

The 38 biophysical markers of all tested samples were tabulated and hierarchical clustering was performed based on the DLD assay biophysical markers (FIG. 101). The unsupervised clustering grouped the data into 8 clusters with visible biophysical signatures and profiles. Patients with >2 SIRS were generally clustered in group 1-4 while non-infection control and healthy donors were grouped in cluster 5-8. Visible distinction between these groups can be seen in the heatmap. Size and deformability-based biomarkers were elevated for >2 SIRS group while cell distribution biomarkers levels were cluster specific. Cell count biomarker were only highly expressed in certain samples and is not directly correlated with size-based markers for group 3 and 4. This suggest that biophysical markers such as immune cell size and deformability is potentially more sensitive to profile the immune activation states than lagging changes in cell count.

Figure 12:
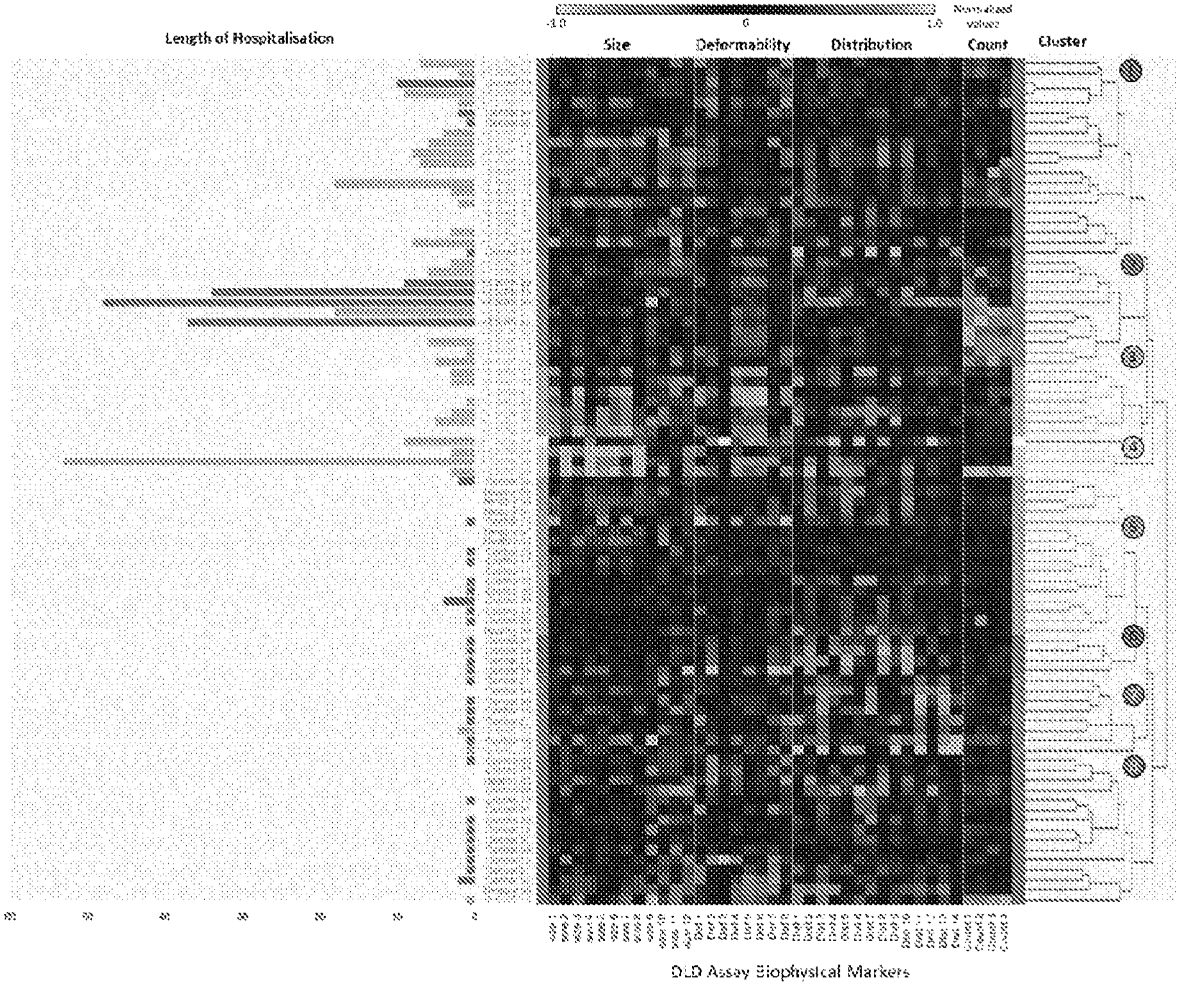
FIG. 12 is an image showing a comparison of hierarchical clustering of 38 biomarker signatures upon admission to ED and hospitalization stay in accordance with various embodiments disclosed herein.

Interestingly, 4 patients from >2 SIRS group were later diagnosed to have sepsis with a SOFA score of >4 for >2 SIRS 03, 16, 22 and 35 in FIG. 101 and were grouped in cluster 2. This group showed moderate increase in size and cell count but relatively larger increase in cell deformability and distribution markers. Cluster group 2 also correlated a longer hospitalization stay and this biophysical signature could be useful to prognose severity of disease progression and risk of hospitalisation (See FIG. 12).

Figure 13:
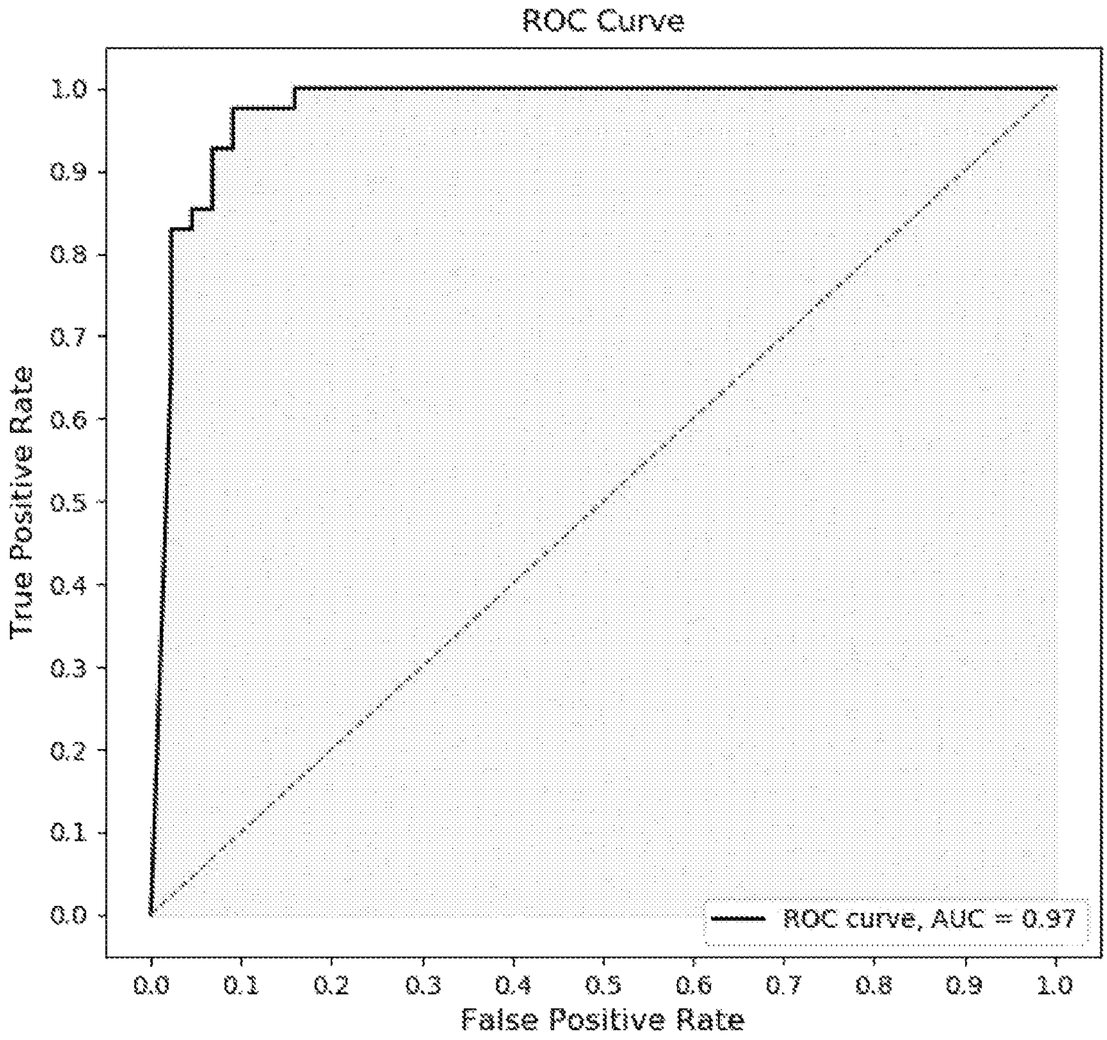
FIG. 13 is a graph showing a ROC curve plotting the True Positive Rate against the False Positive Rate with the area under curve (AUC) at 0.97 in accordance with various embodiments disclosed herein.
Figure 14:
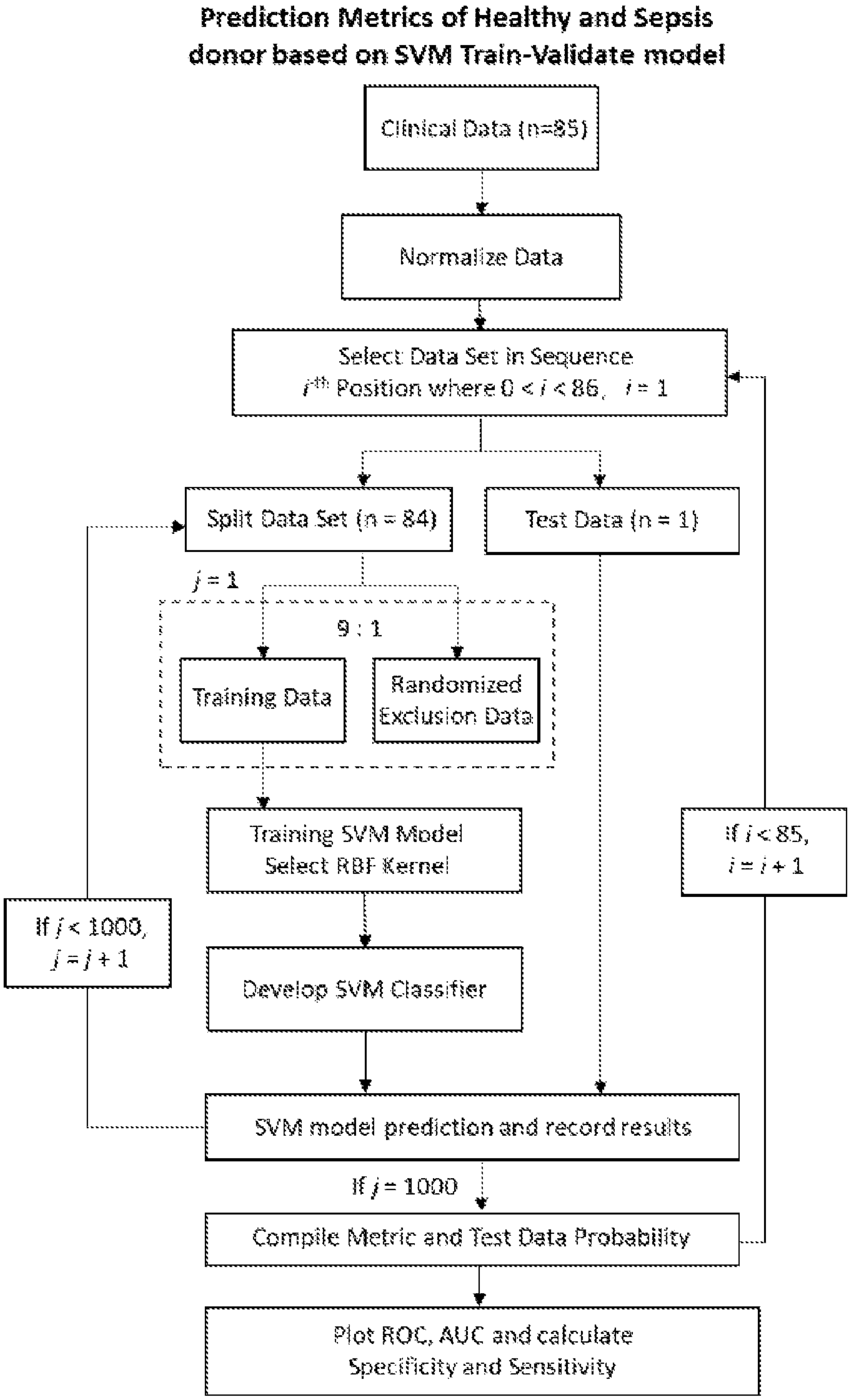
FIG. 14 is a flowchart showing an algorithm for the ROC plotting of all data features for non-infection vs infection controls and classification metrics calculation using the SVM classifier model in accordance with various embodiments disclosed herein.

>2 SIRS 02, 08 and 13 immune signatures were clustered in group 5-8 which was predominantly healthy and non-infection controls. This clustering independently shows that these patients, though exhibiting >2 SIRS, had a lower immune response signature profile which resulted in a short hospitalisation stay of only 1-2 days. On the contrary, Control sample 19 in cluster 1 had a relatively longer hospitalisation stay of 10 days. Finally, the predictive value of 38 biophysical markers to classify non-infection versus infection class of 85 patient samples was analysed using the receiver operating characteristic (ROC) curve in FIGS. 13 and 14. The area under curve (AUC), specificity and sensitivity of the assay was 0.97, 0.91 and 0.92 respectively. This result was performed based on support vector machine model for classification (FIG. 14)

The results discussed above show that the DLD devices function as sensitive and quantitative assay of immune cell biophysical signatures in relation to the WBCs' real-time activation levels. The swift response of the immune system induced by biochemical triggers are also expressed in biophysical properties of the leukocytes for effective extravasation and other functions. Studies have shown correlation of immune cell biophysical changes with cytoskeletal remodelling, protein production and cell proliferation. As WBCs are activated by various internal or external triggers, the extent and direction of these changes were sensitively measured using the DLD assay described in various exemplary embodiments. The results highlight new insights, which advances both engineering of precision microfluidics and clinical research.

Applications

First, various DLD structures were shown to illicit different sorting signatures on deformable cells. The selection of L and $L^{-1}$ was not arbitrary as it is based on previous observations on RBC sorting performance. Various embodiments of the present disclosure can entail the possibility that more suitable DLD pillar shapes can exist for the function of biophysical DLD assays. To uncover potentially useful DLD shapes requires deeper and fundamental understanding of particle-pillar-fluid interactions, especially for deformable particles. The empirical evidence and simulations discussed show that using these different signatures, a collective cell $D_{app}$ and deformability response that quantitatively predicts a cell state can be defined.

Second, the WBC biophysical DLD assay showed divergent deformability response for in vitro assays and direct whole blood assay. In vitro assays here, which aim to study WBC immune response, were not able to replicate the biophysical deformability properties of WBC from patients who show clear signs of infection. This could be due to blood treatment methods using ethylenediaminetetraacetic acid (EDTA), stimulants concentration and incubation time. Recent advances in microfluidic devices based on high-throughput single cell deformability imaging cytometry mechano-phenotyping also showed that natively activated immune cells increases its deformability and size and also showed oscillating immune activity during immune activation and sepsis. Similarly, the results discussed based on whole blood rapid immune profiling supports this crucial finding and raises new research questions and potentially challenging current methods of using in vitro studies to elucidate physiological immune responses.

Finally, the clinical study discussed shows that patient classification using DLD biophysical assay was possible showing distinct label-free biomarker profiles of healthy donors and patients admitted to the emergency department with and without infection. The approach adopted differs substantially from previous ICU-based studies where patients who have clear manifestations of symptoms and signs of severe disease and immune dysregulation. Importantly, these patients were recruited at admission to the ED with diverse pre-existing conditions such as diabetes mellitus and hypertension but did not progress to full-blown sepsis, characterized by presence of organ dysfunction. Yet, immune biophysical markers show independent and good indication of its diagnostic or prognostic potential, especially the possibility for identifying patients with non-infection-related medical conditions. While a larger clinical study is needed to further evaluate potential biophysical immune response phenotypes and its utility in the field, the study discussed adds scientific evidence to existing works on biophysical parameters as an important marker for immune profiling.

Various embodiments of the present disclosure provide unique biophysical signatures when immune cells are sorted from whole blood within unconventional DLD pillars of L and $L^{-1}$ shape. These signatures result in the formulation of 38 biophysical markers which enable the profiling of immune responses of patients recruited from emergency department with a detection sensitivity of 0.91 and specificity of 0.92. Given that the DLD assay in various embodiments disclosed herein takes 15 minutes to perform, uses less than 20 μL of whole blood and only requires video capture frame rates of up to 150 fps, the system can potentially be developed into a portable unit for point-of-care whole blood sparing assays which could significantly improve the diagnosis and stratification of patients with systemic inflammation response syndrome within the ED and other primary care settings. The availability of such an adjunct with both real-time information and rapid turnaround time is crucial as incoming patients to the ED from the community are highly undifferentiated. Being able to quickly identify at-risk patients and render measures to prevent organ dysfunction will be the key actionable information provided by this tool. This contrasts with patients in the ICU who already have clinical evidence of organ dysfunction through standard laboratory investigations and physiological parameters.

Experimental Section/Methods

The methods taken for conducting the DLD assays in accordance with various embodiments disclosed herein are provided as follows.

Device Design

DLD is a sensitive size-based sorting technique, using a regularly spaced pillar array where the separation can be determined by the established empirical formula:

$$Dc = 1.4G\tan\ominus^{0.48} \quad (1)$$

Where G is the regular spacing between pillars and θ is the offsetting angle of the pillars. Two DLD chips with 21 DLD segments to compare L and $L^{-1}$ shape DLD pillars were designed. The G used measures 23 μm and with $D_c$ of device ranging from 6.0 to 16.0 μm, each DLD segment increases the $D_c$ by a step of 0.5 μm. The period of the array is 50 μm.

Device Fabrication

The device was fabricated using standard photolithography methods. A chromed quartz mask with the designs specified was ordered from JD Photo Data (Hitchin, UK). A mask aligner was used to fabricate an SU-8 mold using SU-8 2015 and spun to a thickness of approximately 20 μm. Poly-dimethylsiloxane (PDMS) (Dow Corning, Midland, Michigan) was added in a ratio of 1:10 and poured onto the SU-8 master mold. The PDMS was cured into an oven at 75° C. for 1 hour to crosslink the PDMS. Finally, the PDMS was peeled out of the master mold and cut into the dimensions of the DLD chip.

Three 3 mm holes were punched as inlet reservoirs to hold the blood sample and 1×PBS buffer. A 1.5 mm punch was used in the outlet to connect the device to the tubing and syringe. Finally, the device was bonded onto a glass slide using oxygen plasma surface activation and bonding. The chip was ready to be used the next day.

Figure 15:
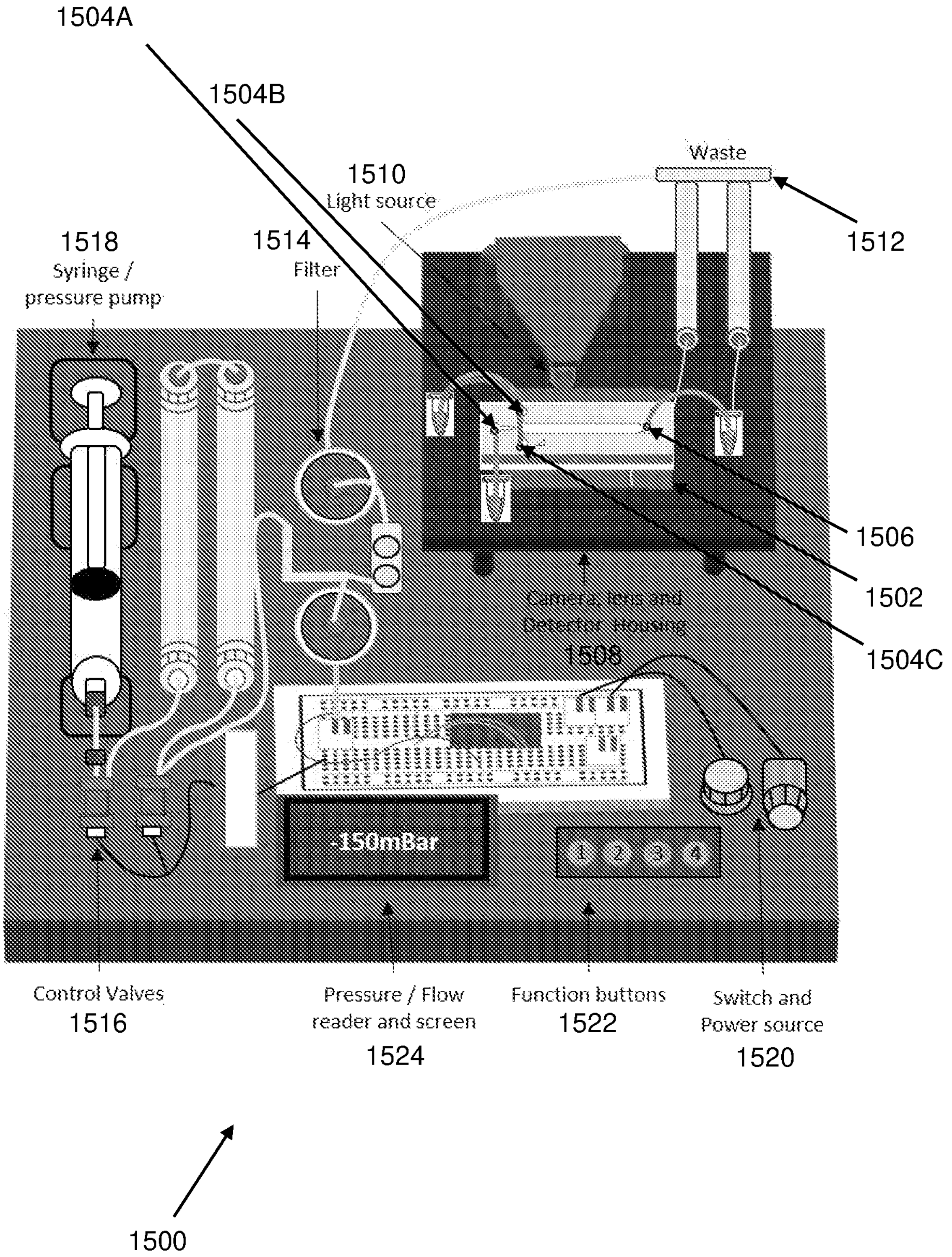
FIG. 15 is a schematic drawing illustrating a system comprising a DLD device in an exemplary embodiment.
Figure 16:
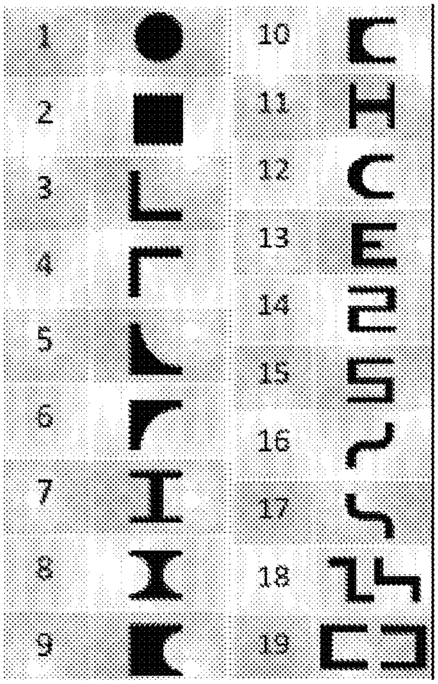
FIG. 16 is a table of shapes.

An exemplary system for conducting DLD assays is shown in FIG. 15. The system 1500 comprises a DLD device 1502 (compare DLD device 100 of FIG. 1A). The DLD device 1502 comprises an inlet port to a sample reservoir 1504A (compare sample/open reservoir 102A of FIG. 1A) and inlet ports to buffer reservoirs 1504B and 1504C (compare buffer/open reservoirs 102B and 102C of FIG. 1A). The DLD device 1502 further comprises an outlet port 1506 (compare outlet port 104 of FIG. 1A). In the exemplary embodiment, the DLD device 1502 is mounted on a detection set up in the form of a camera, lens and detector housing 1508 and has a light source 1510 in the vicinity. The DLD device 1502 is further coupled to a waste collector 1512 via the outlet port 1506 for collecting waste. The waste collector 1512 is further coupled to a filter 1514, control valves 1516 and a syringe/pressure pump 1518. In the exemplary embodiment, the syringe/pressure pump 1518 is configured to control or regulate the flow rates of fluids flowing through the reservoirs of the DLD device 1502. The system 1500 further comprises a switch and power source 1520, function buttons 1522 and a pressure/flow reader and screen 1524. In the exemplary embodiment, the power source 1520 and the function buttons 1522 are configured to control the syringe/pressure pump 1518, i.e., to control the flow rates of fluids flowing through the reservoirs of the DLD device 1502. The pressure/flow reader and screen 1524 is configured to display measured pressure and/or flow readings.

Reagents

The beads used were size calibration standards kit 6.2, 7.2, 8.3 and 10.2 μm beads from Bangslab (Bangs Laboratories, Fishers, Indiana). They were resuspended (2 million $mL^{-1}$) to 25 be used in the characterisation tests. Lipopolysaccharides from *Escherichia coli* O111: B4 (L2630) and Phorbol 12-myristate 13-acetate (P8139) were purchased from Merck-Sigma (St Louis, Missouri). The LPS concentration (5 ng/mL) was determined based on previous works. 1× phosphate buffer solutions were used for all dilutions of beads and as sample buffer.

Donor Selection Criteria

Patient recruitment from the ED of the National University Hospital, Singapore, was conducted with ethics approval from the local institutional review board (National Healthcare Group Singapore, Domain Specific Review Board, DSRB reference number: 2018/00115). Written informed consent was obtained from enrolled participants.

The ED controls in the study comprised of patients who attended the ED for symptoms 10 unrelated to inflammatory or infectious conditions such as corneal foreign body, poorly controlled hypertension while the healthy volunteers included fellow colleagues working in the ED. These two groups of donors constitute the "no infection" group (Infection Class=0).

For the "infection" group (Infection Class=1), patients who had a clear and objective source of systemic infection based on preliminary investigations such as chest radiography, urine or blood investigations and fulfils at least 2 SIRS criteria (fever >38 or <36 degrees Celsius; respiratory rate >20/min; heart rate >90/min; white blood cell count >12, 000/mm3, <4,000/mm3, or >10% bands) were enrolled.

Vulnerable population (such as pregnant or incarcerated individuals), patients less than 21 years old, those who refused or were unable to provide written informed consent and patients with "do-not-resuscitate" orders were excluded. Additionally, patients with medical conditions or medications that may result in macrocytosis were also excluded as this could potentially interfere with evaluation of WBC size and deformability. These include conditions such as vitamin B12 deficiency, primary bone marrow disorder, previous gastrectomy, pernicious anemia, alcoholism, COPD, familial macrocytosis, hypothyroidism, cancer and medications like chemotherapy agents, zidovudine, trimethoprim, phenytoin and oral contraceptive pills.

Blood Collection and Testing

All blood collected were from venous blood draw with consent from patients at the ED of National University Hospital, Singapore. Post-recruitment, the blood (3 mL) was drawn into a 3 mL EDTA tube and stored in a cooler box to maintain the temperature. The transport of blood from draw to laboratory experiments was within 1 hour. Blood samples (100 μL) was aliquoted out for each test.

Activation of Leukocytes

All WBC experiments, if not tested immediately, were placed on 37° C. water bath to ensure physiological conditions. There were no dilutions of blood. LPS activation test (5 ng/ml) was incubated for 30 minutes. As each test run was 15 minutes, more vials were prepared in time spacing of 3 minutes each for testing of each flow rate. This was to ensure the tests were performed at 30 minutes interval and the data acquisition time was not a factor. For PMA activation (100 nM and 1000 nM), the samples were incubated for 2 hours. All sample predilutions were made on 1×PBS.

Data Acquisition and Analysis

A Phantom V7.1 (Vision Research, Wayne, New Jersey) was used to capture all visual data from input, output and single cell motion within all DLD devices. The video files were exported into uncompressed ".avi" format for downstream analyses and counting. For each experiment, a total of 2500 frames were captured for analysis. The frame rates used for capture were 15, 30, 60 and 150 fps for 2.5, 5.0, 10.0 and 25.0 μL/min flow rates, respectively. The analysis of cell 20 counting to plot the histogram was performed by a custom python code, which plots the counted cells against the sub-channel location. From the normalized frequency distribution histogram, the mean, S.D., skew, Kurtosis, frequency, and distribution data were available.

Machine Classification

Hierarchical clustering and PCA analysis were all performed using python 3.6 with module "scikit-learn". To develop the ROC curve, a custom algorithm shown in FIG. 14 coupled with support vector machine (SVM) classification using radial basis function kernel was used.

The algorithm used to calculate diagnostic probability values of each sample are shown in FIG. 14. Each sample is selected as a "blind" sample and the remaining (n=84) samples are randomly split 9:1 part for boot strapping method of 1000 cycles to validate the prediction of the "blind" sample based on SVM classification. The boot strapping method results in a probability value of predicting the class of "blind" sample. The probability would then be fed into the ROC curve and comparing with its known class for sensitivity and specificity calculation.

Flow Coupled Cell Simulations

Deformable 2D cell simulations were carried out with the help of a bespoke lattice-Boltzmann-immersed-boundary code. The algorithm is well established for particulate flows in the low Reynolds number regime. The 2D cell is modelled as a ring of marker points that deform according to well defined physical energy potentials.

It will be appreciated by a person skilled in the art that other variations and/or modifications may be made to the embodiments disclosed herein without departing from the spirit or scope of the disclosure as broadly described. For example, in the description herein, features of different exemplary embodiments may be mixed, combined, interchanged, incorporated, adopted, modified, included etc, or the like across different exemplary embodiments. The present embodiments are, therefore, to be considered in all respects to be illustrative and not restrictive.

The invention claimed is:

1. A method of profiling a sample comprising a plurality of cells, the method comprising:

flowing cells from a sample through a first region comprising a first array of pillars having an L shape at different flow velocities or flow rates to sort the cells to different output portions of a first region;

obtaining a plurality of distribution profiles of the cells sorted by the first array in the different output portions of the first region;

flowing cells from the sample through a second region comprising a second array of pillars having an inverse L ($L^{-1}$) shape at different flow velocities or flow rates to sort the cells to different output portions of a second region;

obtaining a plurality of distribution profiles of cells sorted by the second array in the different output portions of the second region;

determining a first cell apparent sizes (L $D_{app}$) based on the plurality of distribution profiles of the cells sorted by the first array, and a second cell apparent sizes ($L^{-1}$ $D_{app}$) based on the plurality of distribution profiles of the cells sorted by the second array;

obtaining a first cell-deformability modulus ($CDM_L$) based on changes in the first cell apparent sizes (L $D_{app}$) at different flow velocities or flow rates, and a second cell-deformability modulus ($CDM_L^{-1}$) based on changes in the second cell apparent sizes ($L^{-1}$ $D_{app}$) at different flow velocities or flow rates;

deriving a biophysical signature of the sample based on the first cell apparent sizes (L $D_{app}$) and the first cell-deformability modulus ($CDM_L$), and the second cell apparent sizes ($L^{-1}$ $D_{app}$) and the second cell-deformability modulus ($CDM_L^{-1}$); and determining a presence of an infection and/or inflammation in a subject based on the biophysical signature of the sample, and wherein the cells comprise immune cells;

wherein:

the biophysical signature comprises a plurality of biomarker features categorized into four groups: size, deformability, distribution, and cell count; and a group of the deformability comprises a feature named Def 6 described as $CDM_{dot}$; wherein the $CDM_{dot}$ is a product of the first cell-deformability modulus ($CDM_L$) and the second cell-deformability modulus ($CDM_L^{-1}$).

2. The method of claim 1, wherein the pillars of each the first and second arrays are arranged based on equation (A):

$$Dc = ag \tan \theta^b \tag{A}$$

where $D_c$ is the deterministic lateral displacement (DLD) cut-off size, each of a and b is a value that is independently selected from a value in the range of 0.48 to 1.4, g represents the closest distance between the pillars and θ is the offsetting angle of the pillars.

3. The method of claim 2, wherein $D_c$ is in the range of 5.0 μm to 16.0 μm.

4. A sample profiling system comprising:

a first region comprising a first array of pillars having an L shape configured to sort cells from a sample flowed therethrough at different flow velocities or flow rates and provide a plurality of different output portions of the first region and provide one or more distribution profiles of the sorted cells sorted in the different output portions of the first region; and a second region comprising a second array of pillars having an inverse L ($L^{-1}$) shape configured to sort cells from the sample flowed therethrough at different flow velocities or flow rates and provide a plurality of different output portions of the second region and provide one or more distribution profiles of the cells sorted in the different output portions of the second region; and a processing unit configured to:

flow cells from a sample through a first region comprising a first array of pillars having an L shape at different flow velocities or flow rates to sort the cells to different output portions of a first region;

obtain a plurality of distribution profiles of the cells sorted by the first array in the different output portions of the first region;

flow cells from the sample through a second region comprising a second array of pillars having an inverse L ($L^{-1}$) shape at different flow velocities or flow rates to sort the cells to different output portions of a second region;

obtain a plurality of distribution profiles of cells sorted by the second array in the different output portions of the second region;

determine a first cell apparent sizes (L $D_{app}$) based on the plurality of distribution profiles of the cells sorted by the first array, and a second cell apparent sizes ($L^{-1}$ $D_{app}$) based on the plurality of distribution profiles of the cells sorted by the second array;

obtain a first cell-deformability modulus ($CDM_L$) based on changes in the first cell apparent sizes (L $D_{app}$) at different flow velocities or flow rates, and a second cell-deformability modulus ($CDM_L^{-1}$) based on changes in the second cell apparent sizes ($L^{-1}$ $D_{app}$) at different flow velocities or flow rates;

derive a biophysical signature of the sample based on the first cell apparent sizes (L $D_{app}$) and the first cell-deformability modulus ($CDM_L$), and the second cell apparent sizes ($L^{-1}$ $D_{app}$) and the second cell-deformability modulus ($CDM_L^{-1}$); and determine a presence of an infection and/or inflammation in a subject based on the biophysical signature of the sample, and wherein the cells comprise immune cells;

wherein:

the biophysical signature comprises a plurality of biomarker features categorized into four groups: size, deformability, distribution, and cell count; and a group of the deformability comprises a feature named Def 6 described as $CDM_{dot}$, wherein the $CDM_{dot}$ is a product of the first cell-deformability modulus ($CDM_L$) and the second cell-deformability modulus ($CDM_L^{-1}$).

5. The system of claim 4, wherein each of the first and second regions is fluidically coupled to at least one input reservoir and at least one output port.

6. The system of claim 4, wherein the pillars of each the first and second array are arranged based on equation (A):

$$Dc = ag\tan\theta^b \quad \text{(A)}$$

where $D_c$ is the deterministic lateral displacement (DLD) cut-off size, each of a and b is a value that is independently selected from a value in the range of 0.48 to 1.4, g represents the closest distance between the pillars and θ is the offsetting angle of the pillars.

7. The system of claim 6, wherein the first region comprising the first array of pillars and the second region comprising the second array of pillars each comprise a plurality of segments, each segment differing from the adjacent segment by the offsetting angle of the pillars (θ) and the corresponding DLD cut-off size ($D_c$).

8. The system of claim 6, wherein $D_c$ is in the range of 5.0 μm to 16.0 μm.

9. The method of claim 1, wherein the closest distance between adjacent pillars in the first and second array of pillars is larger than a cell size of the cells flowing therethrough.

10. The system of claim 4, wherein the closest distance between adjacent pillars in the first and second array of pillars is larger than a cell size of the cells configured to flow therethrough.

11. The method of claim 1, wherein the different flow velocities or flow rates comprises a first velocity and a second velocity, and the first velocity is less than the second velocity, wherein a group of the size comprises 12 features named Sizes 1-12, and wherein Size 1, described as $L^{-1}$ $D_{app}$ @ the first velocity, is a white blood cell (WBC) size measured using deterministic lateral displacement (DLD) of the second array of pillars at the first velocity;

Size 2, described as $L^{-1}$ $D_{app}$ @ 25.0 μL/min, is a WBC size measured using DLD of the second array of pillars at 25.0 μL/min;

Size 3, described as L $D_{app}$ @ the first velocity, is a WBC size measured using DLD of the first array of pillars at the first velocity;

Size 4, described as L $D_{app}$ @ 25.0 μL/min, is a WBC size measured using DLD of the first array of pillars at 25.0 μL/min;

Size 5, described as <$L^{-1}$ $D_{app}$>, is a mean size measure at 2.5 and 25.0 μL/min for DLD of the second array of pillars;

Size 6, described as <L $D_{app}$>, is a mean size measure at 2.5 and 25.0 μL/min for DLD of the first array;

Size 7, described as Average $D_{app}$ @ the first velocity, is a mean size of WBC at the first velocity for DLD of the first array of pillars and the second array of pillars;

Size 8, described as Average $D_{app}$ @ 25.0 μL/min, is a mean size of WBC at 25.0 μL/min for DLD of the first array of pillars and the second array of pillars;

Size 9, described as Stdev of $L^{-1}$ $D_{app}$ @ the first velocity, is a standard deviation of WBC size for DLD of the second array of pillars at the first velocity;

Size 10, described as Stdev of $L^{-1}$ $D_{app}$ @ 25.0 μL/min, is a standard deviation of WBC size for DLD of the second array of pillars at 25.0 μl/min;

Size 11, described as Stdev of L $D_{app}$ @ the first velocity, is a standard deviation of WBC size for DLD of the first array of pillars at the first velocity; and Size 12, described as Stdev of L $D_{app}$ @ 25.0 L/min, is a standard deviation of WBC size for DLD of the first array of pillars at 25.0 μl/min;

wherein the group of the deformability further comprises 7 features named Defs 1-5 and 7-8, and wherein Def 1, described as Size 1-Size 3, is a comparing size difference between the WBC size measured using DLD of the first array of pillars and the WBC size measured using DLD of the second array of pillars at the first velocity;

Def 2, described as Size 4-Size 2, is a comparing deformed difference between the WBC size measured using DLD of the first array of pillars and the WBC size measured using DLD of the second array of pillars at 25.0 μL/min;

Def 3, described as (Size 1-Size 3)/(Size 2-Size 4), is a Ratio of the comparing size difference vs the comparing deformed difference;

Def 4, described as $CDM_L^{-1}$, is a deformation modulus of the second array of pillars;

Def 5, described as $CDM_L$, is a deformation modulus of the first array of pillars;

Def 7, described as $CDM_L$:$CDM_L^{-1}$, is a ratio of the deformation modulus of the first array of pillars and the deformation modulus of the second array of pillars; and Def 8, described as Size 6-Size 5, is a combined size and deformability difference of the first array of pillars and the deformation modulus of the second array of pillars;

wherein a group of the distribution comprises 14 features named Dists 1-14, and wherein Dist 1, described as Skew: $L^{-1}$ $D_{app}$ @ the first velocity, is a skew of a histogram for the second array of pillars at the first velocity;

Dist 2, described as Skew: $L^{-1}$ $D_{app}$ @ 25.0 L/min, is a skew of a histogram for the second array of pillars at 25.0 μL/min;

Dist 3, described as Skew: L $D_{app}$ @ the first velocity, is a skew of a histogram for the first array of pillars at the first velocity;

Dist 4, described as Skew: L $D_{app}$ @ 25.0 μL/min, is a skew of a histogram for the first array of pillars at 25.0 μL/min;

Dist 5, described as Dist 1-Dist 2, is a skew difference between size and deformed states for the second array of pillars;

Dist 6, described as Dist 3-Dist 4, is a skew difference between size and deformed states for the first array of pillars;

Dist 7, described as Dist 1-Dist 3, is a skew difference of size histogram of the first array of pillars and the second array of pillars;

Dist 8, described as Dist 2-Dist 4, is a skew difference of deformed histogram of the first array of pillars and the second array of pillars;

Dist 9, described as Kurtosis: $L^{-1}$ $D_{app}$ @ the first velocity, is a kurtosis of the histogram for the second array of pillars at the first velocity;

Dist 10, described as Kurtosis: $L^{-1}$ $D_{app}$ @ 25.0 μL/min, is a kurtosis of the histogram for the second array of pillars at 25.0 μL/min;

Dist 11, described as Kurtosis: L $D_{app}$ @ the first velocity, is a kurtosis of the histogram for the first array of pillars at the first velocity;

Dist 12, described as Kurtosis: L $D_{app}$ @ 25.0 μL/min, is a kurtosis of the histogram for the first array of pillars at 25.0 μL/min;

Dist 13, described as Dist 1*Dist 9, is a product amplification of the skew and the kurtosis for the second array of pillars; and Dist 14, described as Dist 9*Dist 11, is a kurtosis product of size measured at the first array of pillars and the second array of pillars; and wherein a group of the cell count comprises 4 features named Counts 1-4, and wherein Count 1, described as Cell Count: $L^{-1}$ $D_{app}$ @ the first velocity, is a cell count per frame of the second array of pillars at the first velocity;

Count 2, described as Cell Count: $L^{-1}$ $D_{app}$ @ 25.0 L/min, is a cell count per frame of the second array of pillars at 25.0 μL/min;

Count 3, described as Cell Count: L $D_{app}$ @ the first velocity, is a cell count per frame of the first array of pillars at the first velocity; and Count 4, described as Cell Count: L $D_{app}$ @ 25.0 μL/min, is a cell count per frame of the first array of pillars at 25.0 μL/min.

12. The method of claim 1, wherein the determining a presence of an infection and/or inflammation in a subject based on the biophysical signature of the sample comprises:

assigning the subject to a cluster based on a similarity between the plurality of biomarker features of the subject and reference biomarker features associated with a plurality of reference clusters, wherein the plurality of reference clusters were obtained by performing hierarchical clustering on reference biomarker features derived from a plurality of reference samples; and determining that the subject has the infection and/or inflammation when the subject is assigned to a first reference cluster of the plurality of reference clusters; or determining the subject does not have the infection and/or inflammation when the subject is assigned to a second reference cluster of the plurality of reference clusters;

wherein the first cluster is associated with ≥2 systemic inflammatory response syndrome (SIRS) criteria, and the second cluster is associated with non-infection or health.

13. The method of claim 12, wherein the first cluster is one of clusters 1-4, wherein cluster 2 correlates a longer hospitalization stay and can be useful to prognose severity of disease progression and risk of hospitalization.

14. The system of claim 4, wherein the different flow velocities or flow rates comprises a first velocity and a second velocity, and the first velocity is less than the second velocity, wherein a group of the size comprises 12 features named Sizes 1-12, and wherein Size 1, described as $L^{-1}$ $D_{app}$ @ the first velocity, is a white blood cell (WBC) size measured using deterministic lateral displacement (DLD) of the second array of pillars at the first velocity;

Size 2, described as $L^{-1}$ $D_{app}$ @ the second velocity, is a WBC size measured using DLD of the second array of pillars at the second velocity;

Size 3, described as L $D_{app}$ @ the first velocity, is a WBC size measured using DLD of the first array of pillars at the first velocity;

Size 4, described as L $D_{app}$ @ the second velocity, is a WBC size measured using DLD of the first array of pillars at the second velocity;

Size 5, described as <$L^{-1}$ $D_{app}$>, is a mean size measure at 2.5 and the second velocity for DLD of the second array of pillars;

Size 6, described as <L $D_{app}$>, is a mean size measure at 2.5 and the second velocity for DLD of the first array;

Size 7, described as Average $D_{app}$ @ the first velocity, is a mean size of WBC at the first velocity for DLD of the first array of pillars and the second array of pillars;

Size 8, described as Average $D_{app}$ @ the second velocity, is a mean size of WBC at the second velocity for DLD of the first array of pillars and the second array of pillars;

Size 9, described as Stdev of $L^{-1}$ $D_{app}$ @ the first velocity, is a standard deviation of WBC size for DLD of the second array of pillars at the first velocity;

Size 10, described as Stdev of $L^{-1}$ $D_{app}$ @ the second velocity, is a standard deviation of WBC size for DLD of the second array of pillars at the second velocity;

Size 11, described as Stdev of L $D_{app}$ @ the first velocity, is a standard deviation of WBC size for DLD of the first array of pillars at the first velocity; and Size 12, described as Stdev of L $D_{app}$ @ the second velocity, is a standard deviation of WBC size for DLD of the first array of pillars at the second velocity;

wherein the group of the deformability further comprises 7 features named Defs 1-5 and 7-8, and wherein Def 1, described as Size 1-Size 3, is a comparing size difference between the WBC size measured using DLD of the first array of pillars and the WBC size measured using DLD of the second array of pillars at the first velocity;

Def 2, described as Size 4-Size 2, is a comparing deformed difference between the WBC size measured using DLD of the first array of pillars and the WBC size measured using DLD of the second array of pillars at the second velocity;

Def 3, described as (Size 1-Size 3)/(Size 2-Size 4), is a Ratio of the comparing size difference vs the comparing deformed difference;

Def 4, described as $CDM_L^{-1}$, is a deformation modulus of the second array of pillars;

Def 5, described as $CDM_L$, is a deformation modulus of the first array of pillars;

Def 7, described as $CDM_L$:$CDM_L^{-1}$, is a ratio of the deformation modulus of the first array of pillars and the deformation modulus of the second array of pillars; and Def 8, described as Size 6-Size 5, is a combined size and deformability difference of the first array of pillars and the deformation modulus of the second array of pillars;

wherein a group of the distribution comprises 14 features named Dists 1-14, and wherein Dist 1, described as Skew: $L^{-1}$ $D_{app}$ @ the first velocity, is a skew of a histogram for the second array of pillars at the first velocity;

Dist 2, described as Skew: $L^{-1}$ $D_{app}$ @ the second velocity, is a skew of a histogram for the second array of pillars at the second velocity;

Dist 3, described as Skew: L $D_{app}$ @ the first velocity, is a skew of a histogram for the first array of pillars at the first velocity;

Dist 4, described as Skew: L $D_{app}$ @ the second velocity, is a skew of a histogram for the first array of pillars at the second velocity;

Dist 5, described as Dist 1-Dist 2, is a skew difference between size and deformed states for the second array of pillars;

Dist 6, described as Dist 3-Dist 4, is a skew difference between size and deformed states for the first array of pillars;

Dist 7, described as Dist 1-Dist 3, is a skew difference of size histogram of the first array of pillars and the second array of pillars;

Dist 8, described as Dist 2-Dist 4, is a skew difference of deformed histogram of the first array of pillars and the second array of pillars;

Dist 9, described as Kurtosis: $L^{-1}$ $D_{app}$ @ the first velocity, is a kurtosis of the histogram for the second array of pillars at the first velocity;

Dist 10, described as Kurtosis: $L^{-1}$ $D_{app}$ @ the second velocity, is a kurtosis of the histogram for the second array of pillars at the second velocity;

Dist 11, described as Kurtosis: L $D_{app}$ @ the first velocity, is a kurtosis of the histogram for the first array of pillars at the first velocity;

Dist 12, described as Kurtosis: L $D_{app}$ @ the second velocity, is a kurtosis of the histogram for the first array of pillars at the second velocity;

Dist 13, described as Dist 1*Dist 9, is a product amplification of the skew and the kurtosis for the second array of pillars; and Dist 14, described as Dist 9*Dist 11, is a kurtosis product of size measured at the first array of pillars and the second array of pillars; and wherein a group of the cell count comprises 4 features named Counts 1-4, and wherein Count 1, described as Cell Count: $L^{-1}$ $D_{app}$ @ the first velocity, is a cell count per frame of the second array of pillars at the first velocity;

Count 2, described as Cell Count: $L^{-1}$ $D_{app}$ @ the second velocity, is a cell count per frame of the second array of pillars at the second velocity;

Count 3, described as Cell Count: L $D_{app}$ @ the first velocity, is a cell count per frame of the first array of pillars at the first velocity; and Count 4, described as Cell Count: L $D_{app}$ @ the second velocity, is a cell count per frame of the first array of pillars at the second velocity.

15. The system of claim 4, wherein the determining a presence of an infection and/or inflammation in a subject based on the biophysical signature of the sample comprises:

assigning the subject to a cluster based on a similarity between the plurality of biomarker features of the subject and reference biomarker features associated with a plurality of reference clusters, wherein the plurality of reference clusters were obtained by performing hierarchical clustering on reference biomarker features derived from a plurality of reference samples; and determining that the subject has the infection and/or inflammation when the subject is assigned to a first reference cluster of the plurality of reference clusters; or determining the subject does not have the infection and/or inflammation when the subject is assigned to a second reference cluster of the plurality of reference clusters;

wherein the first cluster is associated with ≥2 systemic inflammatory response syndrome (SIRS) criteria, and the second cluster is associated with non-infection or health.

16. The system of claim 15, wherein the first cluster is one of clusters 1-4, wherein cluster 2 correlates a longer hospitalization stay and can be useful to prognose severity of disease progression and risk of hospitalization.

* * * * *